(12) United States Patent
Gupta et al.

(10) Patent No.: US 9,699,017 B1
(45) Date of Patent: Jul. 4, 2017

(54) DYNAMIC UTILIZATION OF BANDWIDTH FOR A QUORUM-BASED DISTRIBUTED STORAGE SYSTEM

(71) Applicant: Amazon Technologies, Inc., Reno, NV (US)

(72) Inventors: Anurag Windlass Gupta, Atherton, CA (US); Pradeep Jnana Madhavarapu, Mountain View, CA (US); Samuel James McKelvie, Seattle, WA (US); Yan Valerie Leshinsky, Kirkland, WA (US)

(73) Assignee: Amazon Technologies, Inc., Reno, NV (US)

( * ) Notice: Subject to any disclaimer, the term of this patent is extended or adjusted under 35 U.S.C. 154(b) by 226 days.

(21) Appl. No.: 14/036,783

(22) Filed: Sep. 25, 2013

(51) Int. Cl.
   *G06F 15/16* (2006.01)
   *H04L 29/08* (2006.01)
   *G06F 12/00* (2006.01)

(52) U.S. Cl.
   CPC .. *H04L 29/08549* (2013.01); *H04L 29/08072* (2013.01)

(58) Field of Classification Search
   USPC ................................ 709/203, 223–229, 250
   See application file for complete search history.

(56) References Cited

U.S. PATENT DOCUMENTS

| | | | |
|---|---|---|---|
| 5,280,612 A | 1/1994 | Lorie et al. | |
| 5,452,445 A | 9/1995 | Hallmark et al. | |
| 5,471,614 A | 11/1995 | Kakimoto | |
| 5,524,205 A | 6/1996 | Lomet et al. | |
| 5,530,850 A | 6/1996 | Ford et al. | |

(Continued)

FOREIGN PATENT DOCUMENTS

| | | |
|---|---|---|
| CA | 2783370 | 7/2011 |
| EP | 0675451 | 10/1995 |

(Continued)

OTHER PUBLICATIONS

"Amazon Web Services Blog" Downloaded Apr. 30, 2013 from http://aws.typepad.com/aws/2010/10/amazon-rdsannouncing-read-replicas.html, Published Oct. 5, 2010 pp. 1-11.

(Continued)

*Primary Examiner* — Zarni Maung
(74) *Attorney, Agent, or Firm* — Robert C. Kowert; Meyertons, Hood, Kivlin, Kowert & Goetzel, P.C.

(57) ABSTRACT

A storage client and a quorum-based distributed storage system may implement dynamic utilization of bandwidth for a quorum-based distributed storage system. An update at a storage client may be received, and storage nodes of a protection group may be sent a write request indicating the update. In some embodiment, storage nodes that receive the write request may determine whether other storage nodes have not received the update and send the write request to be completed at those other storage nodes. In some embodiments, if a latency threshold is exceeded other storage nodes in the protection group not previously sent the write request may be identified and sent the write request. Based on acknowledgements received from storage nodes in the distributed storage system, it may be determined whether a write quorum requirement is met for a write request.

23 Claims, 14 Drawing Sheets

(56) References Cited

U.S. PATENT DOCUMENTS

| | | | |
|---|---|---|---|
| 5,870,758 A | 2/1999 | Bamford et al. | |
| 5,907,848 A | 5/1999 | Zaiken et al. | |
| 6,233,585 B1 | 5/2001 | Gupta et al. | |
| 6,240,413 B1 | 5/2001 | Learmont | |
| 6,615,219 B1 | 9/2003 | Bruso et al. | |
| 6,631,374 B1 | 10/2003 | Klein et al. | |
| 6,732,124 B1 | 5/2004 | Koseki et al. | |
| 6,732,171 B2 | 5/2004 | Hayden | |
| 6,832,229 B2 | 12/2004 | Reed | |
| 6,976,022 B2 | 12/2005 | Vemuri et al. | |
| 7,010,645 B2 | 3/2006 | Hetzler et al. | |
| 7,089,253 B2 | 8/2006 | Hinshaw et al. | |
| 7,146,386 B2 | 12/2006 | Xiao | |
| 7,287,034 B2 | 10/2007 | Wong et al. | |
| 7,305,386 B2 | 12/2007 | Hinshaw et al. | |
| 7,308,456 B2 | 12/2007 | Friske et al. | |
| 7,328,226 B1 | 2/2008 | Karr et al. | |
| 7,716,645 B2 | 5/2010 | Dolby et al. | |
| 7,747,663 B2 | 6/2010 | Atkin et al. | |
| 7,885,922 B2 | 2/2011 | Pareek et al. | |
| 7,930,271 B2 | 4/2011 | Tarbell | |
| 7,937,551 B2 | 5/2011 | Schott | |
| 7,979,652 B1* | 7/2011 | Sivasubramanian | G06F 11/2094 711/141 |
| 7,979,670 B2 | 7/2011 | Saliba et al. | |
| 8,086,650 B1 | 12/2011 | Milford | |
| 8,209,515 B2 | 6/2012 | Schott | |
| 8,255,627 B2 | 8/2012 | Blinick et al. | |
| 8,266,114 B2 | 9/2012 | Mace et al. | |
| 8,271,830 B2 | 9/2012 | Erofeev | |
| 8,289,801 B2 | 10/2012 | Smith et al. | |
| 8,301,670 B2 | 10/2012 | Revah et al. | |
| 8,326,897 B2 | 12/2012 | Butterworth et al. | |
| 8,341,128 B1 | 12/2012 | Ruggiero | |
| 8,370,715 B2 | 2/2013 | Hafner et al. | |
| 8,380,670 B2 | 2/2013 | Kuber et al. | |
| 8,392,479 B1 | 3/2013 | Pantin | |
| 8,396,831 B2 | 3/2013 | Larson et al. | |
| 8,412,689 B2 | 4/2013 | Reid et al. | |
| 8,412,752 B2 | 4/2013 | Dodge | |
| 8,429,121 B2 | 4/2013 | Pareek et al. | |
| 8,838,539 B1* | 9/2014 | Ashcraft | G06F 12/0806 707/637 |
| 2002/0107835 A1 | 8/2002 | Coram et al. | |
| 2002/0143733 A1 | 10/2002 | Mukkamalla et al. | |
| 2004/0133622 A1 | 7/2004 | Clubb et al. | |
| 2004/0225696 A1 | 11/2004 | Wong et al. | |
| 2004/0249869 A1 | 12/2004 | Oksanen | |
| 2005/0149578 A1* | 7/2005 | Sustman | G06F 11/1464 |
| 2006/0020634 A1 | 1/2006 | Huras et al. | |
| 2006/0047626 A1 | 3/2006 | Raheem | |
| 2006/0224636 A1 | 10/2006 | Kathuria et al. | |
| 2006/0253504 A1* | 11/2006 | Lee | G06F 17/30578 |
| 2008/0010322 A1 | 1/2008 | Lee et al. | |
| 2008/0183973 A1* | 7/2008 | Aguilera | G06F 11/1464 711/147 |
| 2008/0294648 A1 | 11/2008 | Lin et al. | |
| 2009/0249001 A1 | 10/2009 | Narayanan et al. | |
| 2010/0036861 A1 | 2/2010 | Srihari et al. | |
| 2010/0050172 A1 | 2/2010 | Ferris | |
| 2010/0192131 A1 | 7/2010 | Dolby et al. | |
| 2011/0035548 A1 | 2/2011 | Kimmel et al. | |
| 2011/0060724 A1 | 3/2011 | Chan | |
| 2011/0072217 A1 | 3/2011 | Hoang et al. | |
| 2011/0161496 A1 | 6/2011 | Nicklin | |
| 2011/0251997 A1 | 10/2011 | Wang et al. | |
| 2012/0011106 A1 | 1/2012 | Reid et al. | |
| 2012/0041899 A1 | 2/2012 | Greene et al. | |
| 2012/0174112 A1 | 7/2012 | Vaidya et al. | |
| 2012/0191648 A1 | 7/2012 | Kuber et al. | |
| 2012/0259889 A1 | 10/2012 | Dinker et al. | |
| 2012/0297073 A1 | 11/2012 | Glover et al. | |
| 2012/0310985 A1 | 12/2012 | Gale et al. | |
| 2012/0310986 A1 | 12/2012 | Frantz et al. | |
| 2012/0310991 A1 | 12/2012 | Frantz et al. | |
| 2012/0323849 A1 | 12/2012 | Garin, Jr. et al. | |
| 2013/0036149 A1* | 2/2013 | Kosuru | G06F 9/5066 709/201 |
| 2013/0036281 A1 | 2/2013 | Revah et al. | |
| 2013/0042056 A1 | 2/2013 | Shats et al. | |
| 2013/0042156 A1 | 2/2013 | Srinivasan et al. | |
| 2013/0080386 A1 | 3/2013 | Dwyer et al. | |
| 2013/0080388 A1 | 3/2013 | Dwyer et al. | |
| 2013/0086129 A1 | 4/2013 | Brown et al. | |
| 2013/0290249 A1* | 10/2013 | Merriman | G06F 17/30578 707/610 |

FOREIGN PATENT DOCUMENTS

| | | |
|---|---|---|
| EP | 1630674 | 3/2006 |
| JP | H10-254748 | 9/1998 |
| JP | 2005276094 | 10/2005 |
| JP | 2007200182 | 8/2007 |
| JP | 2012507072 | 3/2012 |

OTHER PUBLICATIONS

"Bloom Filter" Downloaded from http://en.wikipedia.org/wiki/Bloom_filter on May 15, 2013, pp. 1-12.

John Clarke "SQL Result Set Cache in Oracle 11 gR2" published Nov. 16, 2011 downloaded May 15, 2013 from http://www.centroid.com/knowledgebase/blog/sql-result-set-cache-in-oracle-11 gr2, pp. 1-27.

Jim Czuprynski "Oracle Database 11g: SQL Query Result Set Caching" published Jul. 30,2008, downloaded May 15, 2013 from http://www.databasejournal.com/features/oracle/article.php/3760761/0racle-Database-11 g-SQL -Query-Result-Set-Caching.htm, pp. 1-7.

"Oracle Database JDBC Developer's Guide and Reference: Chapter 20 Statement and Result Set Caching"downloaded from http://docs.oracle.com/cd/B28359_01/java.1111b31224/stmtcach.htm via the Wayback Machine Nov. 27, 2011, pp. 1-8.

Adrian Billington "Query Result Cache in Oracle 11g" downloaded from http://web.archive.org/web/20080124161135/http://www.oracle-developer.net/display.php?id=503 via the Wayback Machine Jan. 4, 2008, pp. 1-20.

Julian Dontcheff "Bloom Filters for DBAs" published Aug. 28,2012, downloaded from http://juliandontcheff.wordpress.com/2012/08/28/bloom-filters-for-dbas/ on May 14, 2013, pp. 1-4.

Julian Dyke "Result Cache Internals" Nov. 2007, pp. 1-38.

Michele Cyran et al "Oracle Database Concepts 10g Release 2 (10.2)" Oct. 2005, pp. 1-542.

Lance Ashdown et al "Oracle Database Concepts 11g Release 2 (11.2)" Sep. 2011, pp. 1-460.

"Isolation (database systems)" downloaded from http://en.wikipedia.org/wiki/Isolation_(database_systems) on May 15, 2013, pp. 1-7.

U.S. Appl. No. 61/794,572, filed Mar. 15, 2013, Anurag Windlass Gupta, et al.

U.S. Appl. No. 61/799,609, filed Mar. 15, 2013, Anurag Windlass Gupta, et al.

U.S. Appl. No. 61/794,612, filed Mar. 15, 2013, Pradeep Jnana Madhavarapu et al.

U.S. Appl. No. 61/794,658, filed Mar. 15, 2013, Anurag Windlass Gupta, et al.

U.S. Appl. No. 61/799,632, filed Mar. 15, 2013, Anurag Windlass Gupta, et al.

U.S. Appl. No. 13/892,027, filed May 10, 2013, Anurag Windlass Gupta, et al.

U.S. Appl. No. 13/873,467, filed Apr. 30, 2013, Anurag Windlass Gupta, et al.

U.S. Appl. No. 13/902,381, filed May 24, 2013, Anurag Windlass Gupta, et al.

U.S. Appl. No. 13/893,004, filed May 13, 2013, Laurion Darrell Burchall et al.

U.S. Appl. No. 13/901,111, filed May 23, 2013, Anurag Windlass Gupta, et al.

(56) References Cited

OTHER PUBLICATIONS

U.S. Appl. No. 13/894,969, filed May 15, 2013, Grant Alexander MacDonald McAlister et al.
U.S. Appl. No. 13/903,674, filed May 28, 2013, Anurag Windlass Gupta, et al.
U.S. Appl. No. 14/033,343, filed Sep. 20, 2013, Tengiz Kharatishvili et al.
U.S. Appl. No. 14/032,721, filed Sep. 20, 2013, Tengiz Kharatishvili et al.
U.S. Appl. No. 14/032,797, filed Sep. 20, 2013, Pradeep Jnana Madhavarapu et al.
U.S. Appl. No. 14/036,792, filed Sep. 25, 2013, Samuel James McKelvie, et al.
U.S. Appl. No. 14/032,763, filed Sep. 20, 2013, Yan Valerie Leshinsky et al.
U.S. Appl. No. 14/032,681, filed Sep. 20, 2013, Samuel James McKelvie, et al.
Latika C. Savade, et al., "A Technique to Search Log Records using System of Linear Equations", Software Engineering (CONSEG), 2012 CSI Sixth International Conference, IEEE, Sep. 5, 2012, pp. 1-4.
Jim Gray, et al., "Transaction Processing: Concepts and Techniques—Chapter 10", In: "The Morgan Kaufmann Series in data management systems", Jan. 1, 1993, pp. 529-582.
Jim Gray, et al., "Transaction Processing: Concepts and Techniques—Chapter 12", In: "The Morgan Kaufmann series in data management systems", Jan. 1, 1993, pp. 631-657.
Mokrane Bouzeghoub, et al., "A Framework for Analysis of Data Freshness", Information Quality in Information Systems, ACM, Jun. 18, 2004, pp. 59-67.
M. Tamer Ozsu, et al., "Princeiples of Distributed Database Systems—Chapter 13—Data Replication", In: Principles DF Distributed Database Systems, Third Edition, Mar. 2, 2011, Springer, pp. 459-495.
Hector Garcia-Molina, et al., "Database Systems—The Complete Book Second Edition—Chapter 18—Concurrency Control", In: "Database systems the complete book, Second Edition", Jun. 15, 2005, pp. 883-951.
Atul Adya, et al., "Efficient Optimistic Concurrency Control Using Loosely Synchronized Clocks", SIGMOD Record, ACM, vol. 24, No. 2, May 22, 1995, pp. 23-34.

* cited by examiner

US 9,699,017 B1

DYNAMIC UTILIZATION OF BANDWIDTH FOR A QUORUM-BASED DISTRIBUTED STORAGE SYSTEM

BACKGROUND

Data storage systems have implemented many different schemes for efficiently and reliability persisting data. Distributed storage systems may be implemented in order to provide greater availability for storage clients that wish to access data. For example, multiple different devices may maintain copies of data so that requests to access the data may be sent to device that has the availability to process the access request. However, in order to implement a distributed storage system that accurately reflects the state of the data, changes to stored data may have to be persisted across multiple devices.

Typical solutions to persist data changes across devices may involve ensuring that changes are received and persisted at a minimum number of storage devices, often referred to as a write quorum, before they are considered durable. Various mechanisms may be employed for making changes known at these storage devices. For example, a change may be sent to a single storage device which may then send it on to other storage devices to also be persisted, or a change may be sent to multiple copies in parallel. Different considerations of expected use or types of clients of a distributed storage system may influence the solution used to make changes persistent among the storage devices. As operating conditions for the distributed storage system change, mechanisms to persist changes may over-utilize or under-utilize distributed storage system resources, leading to increased performance costs for storage system clients.

Figure 1:
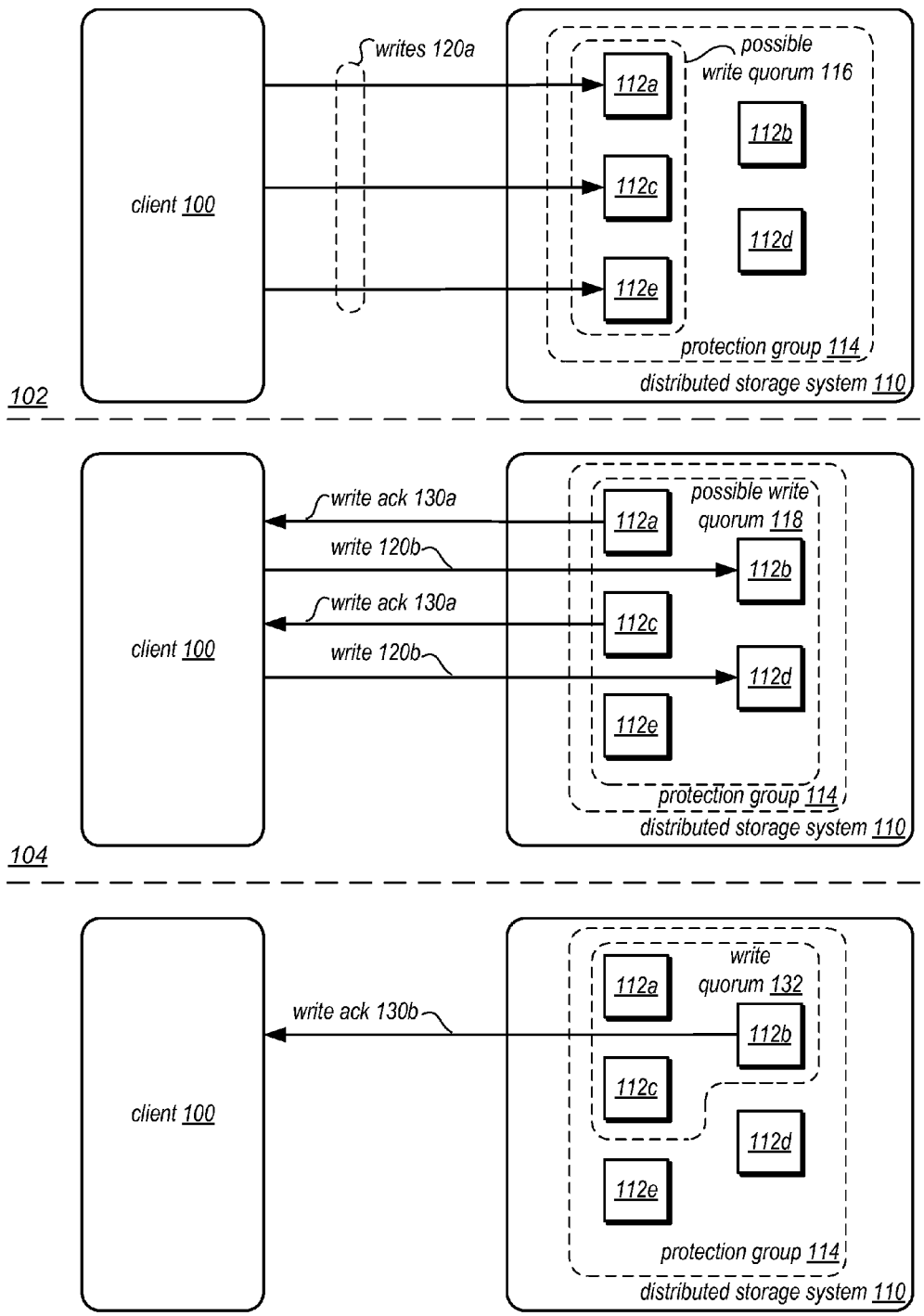
FIG. 1 is a series of block diagrams illustrating dynamic utilization of bandwidth in a quorum-based distributed storage system, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a computer system may be configured to perform operations even when the operations are not currently being performed). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. §112, paragraph six, interpretation for that component.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Various embodiments of dynamic utilization for a distributed storage system are described herein. A distributed storage system may implement multiple storage nodes, referred to as a protection group, storing a replica or version of data that are available for access to a storage system client. Read requests, for example, may be made to one or more of the storage nodes in the protection group in order to read data. Write requests, or updates, to the data may also be made to different storage nodes in the protection group. These write requests may need to be made durable (as well as consistent) among the storage nodes storing the data so that data may be reliability stored. In order to achieve durability (and consistency), a write quorum requirement for write requests may need to be satisfied in order for a write request to be identified as durably at storage.

Different techniques for persisting changes among storage nodes of a protection group may utilize network bandwidth between the storage nodes differently. For example, in some embodiments, a single storage node, or a subset of storage nodes, in a protection group (that may or may not be sufficient to satisfy a write quorum requirement for a write request) may be sent a write request to be completed (i.e. performed, persisted, maintained, etc. . . . ). The storage node or subset of storage nodes may send the write request to other storage nodes in the protection group that have not received (or do not appear to have received the write request from the perspective of the sending storage node). Such forwarding and/or replicating techniques may increase network utilization (as well as utilization of computational resources) among storage nodes within a storage system, but may decrease network utilization (as well as utilization of computational resources) between a storage client, such as the various databases described below, and the storage system. Dynamic utilization of bandwidth may be implemented at a quorum-based distributed storage system, or at a storage client of a quorum-based distributed storage system, such as a database to more efficiently utilize network bandwidth (as well as other storage system resources). Similarly, dynamic utilization may be implemented by a client of a quorum-based distributed storage system to more efficiently utilize network bandwidth (as well as other storage system resources).

As noted above, many different techniques may be employed to implement dynamic utilization of bandwidth in a quorum-based distributed storage system. FIG. 1 is a series of block diagrams illustrating dynamic utilization of bandwidth in a quorum-based distributed storage system, according to some embodiments. As illustrated in scene 102, distributed storage system 110 may offer quorum based storage to a storage client 100. Storage client may, in various embodiments, be a database, such as the distributed database system/service described below with regard to FIGS. 2-8, or various other kinds of clients, systems, or applications that may wish to take advantage of a distributed storage architecture, such as various websites, network-based operations (such as e-commerce or other product purchasing/exchange platforms), content delivery platforms, etc. . . . . . As many different types of storage clients may utilize a distributed storage system the previous examples are not intended to be limiting.

Distributed storage system 110 may implement different storage nodes to store data for client 100. Each of these storage nodes may be implemented by one or more systems or computing devices, such as computing system 1400 described below with regard to FIG. 14, that store data for storage client 100. In FIG. 1, storage nodes 112a, 112b, 112c, 112d, and 112e may be implemented by distributed storage system 110. In some embodiments, distributed storage system 110 may implement protection groups, such as protection group 114, for data stored in distributed storage system 110. Protection groups, such as protection group 114, may include storage nodes that are group members, which may each maintain a replica or version of the data for client 100. In the illustrated example, storage nodes 112a-112e are group members of protection group 114.

A write quorum requirement, as discussed above, may be used to determine whether a particular change or write to data stored for client 100 is durably persisted by protection group 114. For example, a write quorum requirement may be a minimum number of storage nodes in a protection group (e.g., 3 out of 5 storage nodes). Further qualifications or requirements may be added to define the write quorum requirement for an update or write request. For instance, the location of particular storage nodes may be specified, such as requiring that at least two storage nodes in each availability zone receive and persist/complete the update/write for the data. Write quorum requirements may be determined based on client requirements for durability, a service-level agreement (SLA) between distributed storage system 110 and client 100, and/or the current state of the storage system (for example, if one or more storage nodes become unavailable, the write quorum requirement may be temporarily or permanently modified).

Client 100 may, in some embodiments, receive an update (such as an update to a database) or perform some other operation that may instigate a change to data stored in distributed storage system 110. In response, writes 120 a may be sent to different storage nodes of a protection group 114 sufficient to satisfy a write quorum requirement. As illustrated in FIG. 1, writes 120a are sent to a possible write quorum 116 (given a 3/5 write quorum requirement for protection group 114) that includes storage nodes 112a, 112c, and 112e. Note, that the writes 120a are sent to a subset of the storage nodes in protection group 114, less than the entire protection group. The storage nodes sent writes 120a may be dynamically determined, in some embodiments, based on storage health or cost indicators sent to client 100 (such as may be determined at distributed storage system 110) or determined at client 100. These storage health or cost indicators may indicate a change in network utilization among the storage nodes (e.g., heavy traffic to light traffic at one or more of the protection group 114 members), a change in write processing or other measure of performance of a particular one or more group members of protection group 114, or, more generally, any other indicator of the performance distributed storage system 110.

As illustrated at scene 104, client 100 may receive write acknowledgments 130a from storage node 112a and storage node 112c. Client 100, however, may determine that write acknowledgments 130a do not satisfy the write quorum requirement for the write request (e.g., that only 2/5 nodes have acknowledged/completed the write). As part of this determination, in at least some embodiments, a latency threshold may indicate an efficient or acceptable latency for a write to perform. For example, a latency threshold may be based on a performance goal (e.g., 70% of write requests complete within this time). If a current write pending time for a write request exceeds the latency threshold, then it may be determined that the acknowledgments do not satisfy the write quorum requirement (at least not within the time indicated by the latency threshold). In response to determining that the acknowledgments 130a do not satisfy the write quorum requirement, the writes 120b may be sent to storage nodes that were not previously sent the storage nodes. As illustrated in FIG. 1, writes 120b are sent to storage node 112b and 112d. Note that the possible storage nodes that may now be part of satisfying the write quorum 118 has grown to include storage nodes 112b and 112d.

As illustrated at scene 106, one of the storage nodes, 112b, may send an acknowledgment of the write 130b to client 100. Client 100 may determine based on the received acknowledgments that the write quorum for the write request is now satisfied, and the write request may be identified as durable at distributed storage system 110. Although not illustrated, one or more of the storage nodes, 112e or 112d, may also acknowledge the write request, and such acknowledgments may be included in the determination that the write quorum requirement is satisfied.

FIG. 1 illustrates an example of dynamically utilizing bandwidth, by reducing the number of write requests sent to distributed storage system 110 from client 100. The latency threshold may in some embodiments be determined to ensure that write requests that do not commit within a best case latency (e.g., 70%) may still complete within another latency goal by sending the write request to other storage nodes to satisfy the write quorum. Various other techniques for dynamically utilizing bandwidth at a storage client may be implemented. Additionally, distributed storage systems may also implement forwarding and replication techniques discussed below to receive and send write requests to other storage nodes in a protection group in order to satisfy a write quorum requirement that dynamically utilizes bandwidth in a quorum-based distributed storage system. Various different tuning mechanisms, such as adjusting the latency threshold, may be used to ensure that bandwidth is efficiently utilized.

The specification first describes an example of a network-based database service and a network-based distributed storage service that may each implement different techniques to dynamically utilize bandwidth in a quorum-based distributed storage system, according to various embodiments. The distributed storage service may store data for many different types of storage clients, in addition to the distributed database service. Included in the description of the example network-based database service are various aspects of the example network-based database service along with the various interactions between the database service and the distributed storage service. The specification then describes a flowchart of various embodiments of methods for dynamic utilization of bandwidth for a quorum-based distributed storage system. Next, the specification describes an example system that may implement the disclosed techniques. Various examples are provided throughout the specification.

The systems described herein may, in some embodiments, implement a network-based service that enables clients (e.g., subscribers) to operate a data storage system in a cloud computing environment. In some embodiments, the data storage system may be an enterprise-class database system that is highly scalable and extensible. In some embodiments, queries may be directed to database storage that is distributed across multiple physical resources, and the database system may be scaled up or down on an as needed basis. The database system may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system.

More specifically, the systems described herein may, in some embodiments, implement a service-oriented architecture in which various functional components of a single database system are intrinsically distributed. For example, rather than lashing together multiple complete and monolithic database instances (each of which may include extraneous functionality, such as an application server, search functionality, or other functionality beyond that required to provide the core functions of a database), these systems may organize the basic operations of a database (e.g., query processing, transaction management, caching and storage) into tiers that may be individually and independently scalable. For example, in some embodiments, each database instance in the systems described herein may include a database tier (which may include a single database engine head node and a client-side storage system driver), and a separate, distributed storage system (which may include multiple storage nodes that collectively perform some of the operations traditionally performed in the database tier of existing systems).

As described in more detail herein, in some embodiments, some of the lowest level operations of a database, (e.g., backup, restore, snapshot, recovery, log record manipulation, and/or various space management operations) may be offloaded from the database engine to the storage layer (or tier), such as a distributed storage system, and distributed across multiple nodes and storage devices. For example, in some embodiments, rather than the database engine applying changes to a database (or data pages thereof) and then sending the modified data pages to the storage layer, the application of changes to the stored database (and data pages thereof) may be the responsibility of the storage layer itself. In such embodiments, redo log records, rather than modified data pages, may be sent to the storage layer, after which redo processing (e.g., the application of the redo log records) may be performed somewhat lazily and in a distributed manner (e.g., by a background process). In some embodiments, crash recovery (e.g., the rebuilding of data pages from stored redo log records) may also be performed by the storage layer and may also be performed by a distributed (and, in some cases, lazy) background process.

In some embodiments, because only redo logs (and not modified data pages) are sent to the storage layer, there may be much less network traffic between the database tier and the storage layer than in existing database systems. In some embodiments, each redo log may be on the order of one-tenth the size of the corresponding data page for which it specifies a change. Note that requests sent from the database tier and the distributed storage system may be asynchronous and that multiple such requests may be in flight at a time.

In general, after being given a piece of data, a primary requirement of a database is that it can eventually give that piece of data back. To do this, the database may include several different components (or tiers), each of which performs a different function. For example, a traditional database may be thought of as having three tiers: a first tier for performing query parsing, optimization and execution; a second tier for providing transactionality, recovery, and durability; and a third tier that provides storage, either on locally attached disks or on network-attached storage. As noted above, previous attempts to scale a traditional database have typically involved replicating all three tiers of the database and distributing those replicated database instances across multiple machines.

In some embodiments, the systems described herein may partition functionality of a database system differently than in a traditional database, and may distribute only a subset of the functional components (rather than a complete database instance) across multiple machines in order to implement scaling. For example, in some embodiments, a client-facing tier may be configured to receive a request specifying what data is to be stored or retrieved, but not how to store or retrieve the data. This tier may perform request parsing and/or optimization (e.g., SQL parsing and optimization), while another tier may be responsible for query execution. In some embodiments, a third tier may be responsible for providing transactionality and consistency of results. For example, this tier may be configured to enforce some of the so-called ACID properties, in particular, the Atomicity of transactions that target the database, maintaining Consistency within the database, and ensuring Isolation between the transactions that target the database. In some embodiments, a fourth tier may then be responsible for providing Durability of the stored data in the presence of various sorts of faults. For example, this tier may be responsible for change logging, recovery from a database crash, managing access to the underlying storage volumes and/or space management in the underlying storage volumes.

In various embodiments, a database instance may include multiple functional components (or layers), each of which provides a portion of the functionality of the database instance. In one such example, a database instance may include a query parsing and query optimization layer, a query execution layer, a transactionality and consistency management layer, and a durability and space management layer. As noted above, in some existing database systems, scaling a database instance may involve duplicating the entire database instance one or more times (including all of the example layers), and then adding glue logic to stitch them together. In some embodiments, the systems described herein may instead offload the functionality of durability and space management layer from the database tier to a separate storage layer, and may distribute that functionality across multiple storage nodes in the storage layer.

In some embodiments, the database systems described herein may retain much of the structure of the upper half of the database instance, such as query parsing and query optimization layer, a query execution layer, and a transactionality and consistency management layer, but may redistribute responsibility for at least portions of the backup, restore, snapshot, recovery, and/or various space management operations to the storage tier. Redistributing functionality in this manner and tightly coupling log processing between the database tier and the storage tier may improve performance, increase availability and reduce costs, when compared to previous approaches to providing a scalable database. For example, network and input/output bandwidth requirements may be reduced, since only redo log records (which are much smaller in size than the actual data pages) may be shipped across nodes or persisted within the latency path of write operations. In addition, the generation of data pages can be done independently in the background on each storage node (as foreground processing allows), without blocking incoming write operations. In some embodiments, the use of log-structured, non-overwrite storage may allow backup, restore, snapshots, point-in-time recovery, and volume growth operations to be performed more efficiently, e.g., by using metadata manipulation rather than movement or copying of a data page. In some embodiments, the storage layer may also assume the responsibility for the replication of data stored on behalf of clients (and/or metadata associated with that data, such as redo log records) across multiple storage nodes. For example, data (and/or metadata) may be replicated locally (e.g., within a single "availability zone" in which a collection of storage nodes executes on its own physically distinct, independent infrastructure) and/or across availability zones in a single region or in different regions.

In various embodiments, the database systems described herein may support a standard or custom application programming interface (API) for a variety of database operations. For example, the API may support operations for creating a database, creating a table, altering a table, creating a user, dropping a user, inserting one or more rows in a table, copying values, selecting data from within a table (e.g., querying a table), canceling or aborting a query, creating a snapshot, and/or other operations.

In some embodiments, the database tier of a database instance may include a database engine head node server that receives read and/or write requests from various client programs (e.g., applications) and/or subscribers (users), then parses them and develops an execution plan to carry out the associated database operation(s). For example, the database engine head node may develop the series of steps necessary to obtain results for complex queries and joins. In some embodiments, the database engine head node may manage communications between the database tier of the database system and clients/subscribers, as well as communications between the database tier and a separate distributed storage system.

In some embodiments, the database engine head node may be responsible for receiving SQL requests from end clients through a JDBC or ODBC interface and for performing SQL processing and transaction management (which may include locking) locally. However, rather than generating data pages locally, the database engine head node (or various components thereof) may generate redo log records and may ship them to the appropriate nodes of a separate distributed storage system. In some embodiments, a client-side driver for the distributed storage system may be hosted on the database engine head node and may be responsible for routing redo log records to the storage system node (or nodes) that store the segments (or data pages thereof) to which those redo log records are directed. For example, in some embodiments, each segment may be mirrored (or otherwise made durable) on multiple storage system nodes that form a protection group. In such embodiments, the client-side driver may keep track of the nodes on which each segment is stored and may route redo logs to all of the nodes on which a segment is stored (e.g., asynchronously and in parallel, at substantially the same time), when a client request is received. As soon as the client-side driver receives an acknowledgement back from a write quorum of the storage nodes in the protection group (which may indicate that the redo log record has been written to the storage node), it may send an acknowledgement of the requested change to the database tier (e.g., to the database engine head node). For example, in embodiments in which data is made durable through the use of protection groups, the database engine head node may not be able to commit a transaction until and unless the client-side driver receives a reply from enough storage node instances to constitute a write quorum, as may be defined in a protection group policy for the data.

In some embodiments, the database tier (or more specifically, the database engine head node) may include a cache in which recently accessed data pages are held temporarily. In such embodiments, if a write request is received that targets a data page held in such a cache, in addition to shipping a corresponding redo log record to the storage layer, the database engine may apply the change to the copy of the data page held in its cache. However, unlike in other database systems, a data page held in this cache may not ever be flushed to the storage layer, and it may be discarded at any time (e.g., at any time after the redo log record for a write request that was most recently applied to the cached copy has been sent to the storage layer and acknowledged). The cache may implement any of various locking mechanisms to control access to the cache by at most one writer (or multiple readers) at a time, in different embodiments. Note, however, that in embodiments that include such a cache, the cache may not be distributed across multiple nodes, but may exist only on the database engine head node for a given database instance. Therefore, there may be no cache coherency or consistency issues to manage.

In some embodiments, the database tier may support the use of synchronous or asynchronous read replicas in the system, e.g., read-only copies of data on different nodes of the database tier to which read requests can be routed. In such embodiments, if the database engine head node for a given database receives a read request directed to a particular data page, it may route the request to any one (or a particular one) of these read-only copies. In some embodiments, the client-side driver in the database engine head node may be configured to notify these other nodes about updates and/or invalidations to cached data pages (e.g., in order to prompt them to invalidate their caches, after which they may request updated copies of updated data pages from the storage layer).

In some embodiments, the client-side driver running on the database engine head node may expose a private interface to the storage tier. In some embodiments, it may also expose a traditional iSCSI interface to one or more other components (e.g., other database engines or virtual computing services components). In some embodiments, storage for a database instance in the storage tier may be modeled as a single volume that can grow in size without limits, and that can have an unlimited number of IOPS associated with it. When a volume is created, it may be created with a specific size, with a specific availability/durability characteristic (e.g., specifying how it is replicated), and/or with an IOPS rate associated with it (e.g., both peak and sustained). For example, in some embodiments, a variety of different durability models may be supported, and users/subscribers may be able to specify, for their database, a number of replication copies, zones, or regions and/or whether replication is synchronous or asynchronous based upon their durability, performance and cost objectives.

In some embodiments, the client side driver may maintain metadata about the volume and may directly send asynchronous requests to each of the storage nodes necessary to fulfill read requests and write requests without requiring additional hops between storage nodes. For example, in some embodiments, in response to a request to make a change to a database, the client-side driver may be configured to determine the one or more nodes that are implementing the storage for the targeted data page, and to route the redo log record(s) specifying that change to those storage nodes. The storage nodes may then be responsible for applying the change specified in the redo log record to the targeted data page at some point in the future. As writes are acknowledged back to the client-side driver, the client-side driver may advance the point at which the volume is durable and may acknowledge commits back to the database tier. As previously noted, in some embodiments, the client-side driver may not ever send data pages to the storage node servers. This may not only reduce network traffic, but may also remove the need for the checkpoint or background writer threads that constrain foreground-processing throughput in previous database systems.

In some embodiments, many read requests may be served by the database engine head node cache. However, write requests may require durability, since large-scale failure events may be too common to allow only in-memory replication. Therefore, the systems described herein may be configured to minimize the cost of the redo log record write operations that are in the foreground latency path by implementing data storage in the storage tier as two regions: a small append-only log-structured region into which redo log records are written when they are received from the database tier, and a larger region in which log records are coalesced together to create new versions of data pages in the background. In some embodiments, an in-memory structure may be maintained for each data page that points to the last redo log record for that page, backward chaining log records until an instantiated data block is referenced. This approach may provide good performance for mixed read-write workloads, including in applications in which reads are largely cached.

In some embodiments, because accesses to the log-structured data storage for the redo log records may consist of a series of sequential input/output operations (rather than random input/output operations), the changes being made may be tightly packed together. It should also be noted that, in contrast to existing systems in which each change to a data page results in two input/output operations to persistent data storage (one for the redo log and one for the modified data page itself), in some embodiments, the systems described herein may avoid this "write amplification" by coalescing data pages at the storage nodes of the distributed storage system based on receipt of the redo log records.

As previously noted, in some embodiments, the storage tier of the database system may be responsible for taking database snapshots. However, because the storage tier implements log-structured storage, taking a snapshot of a data page (e.g., a data block) may include recording a timestamp associated with the redo log record that was most recently applied to the data page/block (or a timestamp associated with the most recent operation to coalesce multiple redo log records to create a new version of the data page/block), and preventing garbage collection of the previous version of the page/block and any subsequent log entries up to the recorded point in time. In such embodiments, taking a database snapshot may not require reading, copying, or writing the data block, as would be required when employing an off-volume backup strategy. In some embodiments, the space requirements for snapshots may be minimal, since only modified data would require additional space, although user/subscribers may be able to choose how much additional space they want to keep for on-volume snapshots in addition to the active data set. In different embodiments, snapshots may be discrete (e.g., each snapshot may provide access to all of the data in a data page as of a specific point in time) or continuous (e.g., each snapshot may provide access to all versions of the data that existing in a data page between two points in time). In some embodiments, reverting to a prior snapshot may include recording a log record to indicate that all redo log records and data pages since that snapshot are invalid and garbage collectable, and discarding all database cache entries after the snapshot point. In such embodiments, no roll-forward may be required since the storage system will, on a block-by-block basis, apply redo log records to data blocks as requested and in the background across all nodes, just as it does in normal forward read/write processing. Crash recovery may thereby be made parallel and distributed across nodes.

Figure 2:
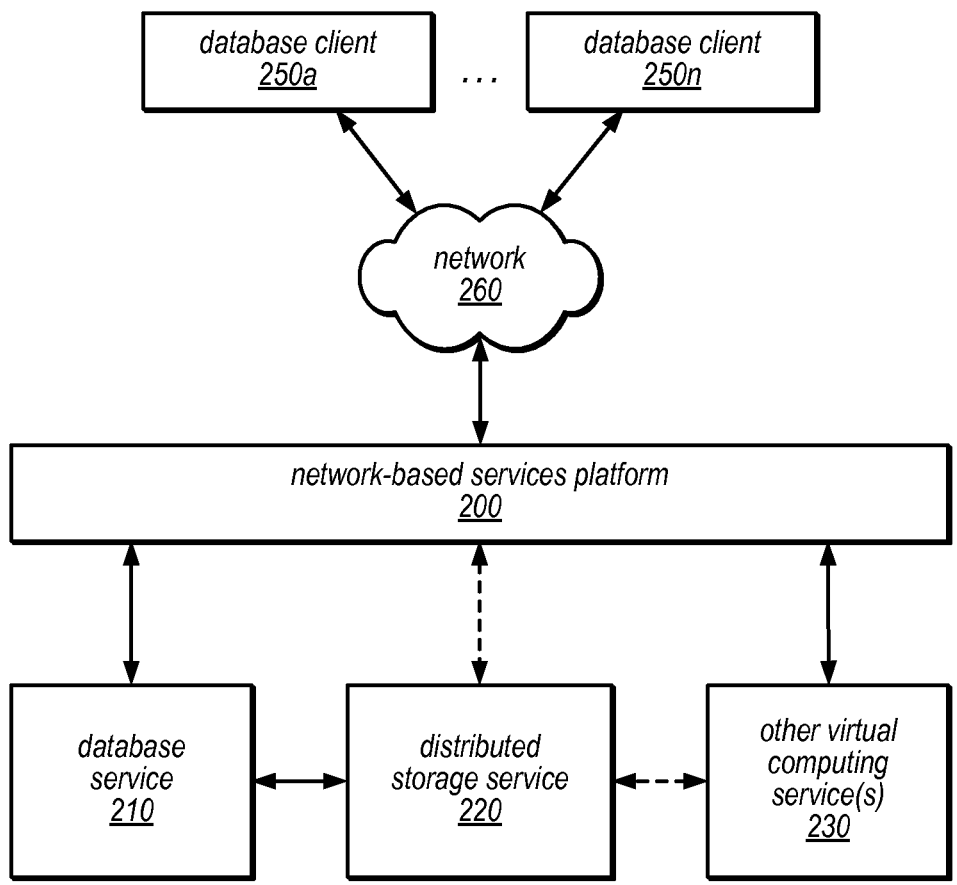
FIG. 2 is a block diagram illustrating a service system architecture that may be configured to implement a network-based database service and a network-based distributed storage service, according to some embodiments.

One embodiment of a service system architecture that may be configured to implement a network-based services-based database service is illustrated in FIG. 2. In the illustrated embodiment, a number of clients (shown as clients 250a-250n) may be configured to interact with a network-based services platform 200 via a network 260. Network-based services platform 200 may be configured to interface with one or more instances of a database service 210, a distributed storage service 220 and/or one or more other virtual computing services 230. It is noted that where one or more instances of a given component may exist, reference to that component herein may be made in either the singular or the plural. However, usage of either form is not intended to preclude the other.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 14 and described below. In various embodiments, the functionality of a given service system component (e.g., a component of the database service or a component of the storage service) may be implemented by a particular node or may be distributed across several nodes. In some embodiments, a given node may implement the functionality of more than one service system component (e.g., more than one database service system component).

Generally speaking, clients 250 may encompass any type of client configurable to submit network-based services requests to network-based services platform 200 via network 260, including requests for database services (e.g., a request to generate a snapshot, etc.). For example, a given client 250 may include a suitable version of a web browser, or may include a plug-in module or other type of code module configured to execute as an extension to or within an execution environment provided by a web browser. Alternatively, a client 250 (e.g., a database service client) may encompass an application such as a database application (or user interface thereof), a media application, an office application or any other application that may make use of persistent storage resources to store and/or access one or more databases. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application configured to interact directly with network-based services platform 200. In some embodiments, client 250 may be configured to generate network-based services requests according to a Representational State Transfer (REST)-style network-based services architecture, a document- or message-based network-based services architecture, or another suitable network-based services architecture.

In some embodiments, a client 250 (e.g., a database service client) may be configured to provide access to network-based services-based storage of databases to other applications in a manner that is transparent to those applications. For example, client 250 may be configured to integrate with an operating system or file system to provide storage in accordance with a suitable variant of the storage models described herein. However, the operating system or file system may present a different storage interface to applications, such as a conventional file system hierarchy of files, directories and/or folders. In such an embodiment, applications may not need to be modified to make use of the storage system service model. Instead, the details of interfacing to network-based services platform 200 may be coordinated by client 250 and the operating system or file system on behalf of applications executing within the operating system environment.

Clients 250 may convey network-based services requests (e.g., a snapshot request, parameters of a snapshot request, read request, restore a snapshot, etc.) to and receive responses from network-based services platform 200 via network 260. In various embodiments, network 260 may encompass any suitable combination of networking hardware and protocols necessary to establish network-based-based communications between clients 250 and platform 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and network-based services platform 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and network-based services platform 200. It is noted that in some embodiments, clients 250 may communicate with network-based services platform 200 using a private network rather than the public Internet. For example, clients 250 may be provisioned within the same enterprise as a database service system (e.g., a system that implements database service 210 and/or distributed storage service 220). In such a case, clients 250 may communicate with platform 200 entirely through a private network 260 (e.g., a LAN or WAN that may use Internet-based communication protocols but which is not publicly accessible).

Generally speaking, network-based services platform 200 may be configured to implement one or more service endpoints configured to receive and process network-based services requests, such as requests to access data pages (or records thereof). For example, network-based services platform 200 may include hardware and/or software configured to implement a particular endpoint, such that an HTTP-based network-based services request directed to that endpoint is properly received and processed. In one embodiment, network-based services platform 200 may be implemented as a server system configured to receive network-based services requests from clients 250 and to forward them to components of a system that implements database service 210, distributed storage service 220 and/or another virtual computing service 230 for processing. In other embodiments, network-based services platform 200 may be configured as a number of distinct systems (e.g., in a cluster topology) implementing load balancing and other request management features configured to dynamically manage large-scale network-based services request processing loads. In various embodiments, network-based services platform 200 may be configured to support REST-style or document-based (e.g., SOAP-based) types of network-based services requests.

In addition to functioning as an addressable endpoint for clients' network-based services requests, in some embodiments, network-based services platform 200 may implement various client management features. For example, platform 200 may coordinate the metering and accounting of client usage of network-based services, including storage resources, such as by tracking the identities of requesting clients 250, the number and/or frequency of client requests, the size of data tables (or records thereof) stored or retrieved on behalf of clients 250, overall storage bandwidth used by clients 250, class of storage requested by clients 250, or any other measurable client usage parameter. Platform 200 may also implement financial accounting and billing systems, or may maintain a database of usage data that may be queried and processed by external systems for reporting and billing of client usage activity. In certain embodiments, platform 200 may be configured to collect, monitor and/or aggregate a variety of storage service system operational metrics, such as metrics reflecting the rates and types of requests received from clients 250, bandwidth utilized by such requests, system processing latency for such requests, system component utilization (e.g., network bandwidth and/or storage utilization within the storage service system), rates and types of errors resulting from requests, characteristics of stored and requested data pages or records thereof (e.g., size, data type, etc.), or any other suitable metrics. In some embodiments such metrics may be used by system administrators to tune and maintain system components, while in other embodiments such metrics (or relevant portions of such metrics) may be exposed to clients 250 to enable such clients to monitor their usage of database service 210, distributed storage service 220 and/or another virtual computing service 230 (or the underlying systems that implement those services).

In some embodiments, network-based services platform 200 may also implement user authentication and access control procedures. For example, for a given network-based services request to access a particular database, platform 200 may be configured to ascertain whether the client 250 associated with the request is authorized to access the particular database. Platform 200 may determine such authorization by, for example, evaluating an identity, password or other credential against credentials associated with the particular database, or evaluating the requested access to the particular database against an access control list for the particular database. For example, if a client 250 does not have sufficient credentials to access the particular database, platform 200 may reject the corresponding network-based services request, for example by returning a response to the requesting client 250 indicating an error condition. Various access control policies may be stored as records or lists of access control information by database service 210, distributed storage service 220 and/or other virtual computing services 230.

It is noted that while network-based services platform 200 may represent the primary interface through which clients 250 may access the features of a database system that implements database service 210, it need not represent the sole interface to such features. For example, an alternate API that may be distinct from a network-based services interface may be used to allow clients internal to the enterprise providing the database system to bypass network-based services platform 200. Note that in many of the examples described herein, distributed storage service 220 may be internal to a computing system or an enterprise system that provides database services to clients 250, and may not be exposed to external clients (e.g., users or client applications). In such embodiments, the internal "client" (e.g., database service 210) may access distributed storage service 220 over a local or private network, shown as the solid line between distributed storage service 220 and database service 210 (e.g., through an API directly between the systems that implement these services). In such embodiments, the use of distributed storage service 220 in storing databases on behalf of clients 250 may be transparent to those clients. In other embodiments, distributed storage service 220 may be exposed to clients 250 through network-based services platform 200 to provide storage of databases or other information for applications other than those that rely on database service 210 for database management. This is illustrated in FIG. 2 by the dashed line between network-based services platform 200 and distributed storage service 220. In such embodiments, clients of the distributed storage service 220 may access distributed storage service 220 via network 260 (e.g., over the Internet). In some embodiments, a virtual computing service 230 may be configured to receive storage services from distributed storage service 220 (e.g., through an API directly between the virtual computing service 230 and distributed storage service 220) to store objects used in performing computing services 230 on behalf of a client 250. This is illustrated in FIG. 2 by the dashed line between virtual computing service 230 and distributed storage service 220. In some cases, the accounting and/or credentialing services of platform 200 may be unnecessary for internal clients such as administrative clients or between service components within the same enterprise.

Although not illustrated, in various embodiments distributed storage service 220 may be configured to interface with backup data store, system, service, or device. Various data, such as data pages, log records, and/or any other data maintained by distributed storage service internal clients, such as database service 210 or other virtual computing services 230, and/or external clients such as clients 250$a$ through 250$n$, may be sent to a backup data store.

Note that in various embodiments, different storage policies may be implemented by database service 210 and/or distributed storage service 220. Examples of such storage policies may include a durability policy (e.g., a policy indicating the number of instances of a database (or data page thereof) that will be stored and the number of different nodes on which they will be stored) and/or a load balancing policy (which may distribute databases, or data pages thereof, across different nodes, volumes and/or disks in an attempt to equalize request traffic). In addition, different storage policies may be applied to different types of stored items by various one of the services. For example, in some embodiments, distributed storage service 220 may implement a higher durability for redo log records than for data pages.

Figure 3:
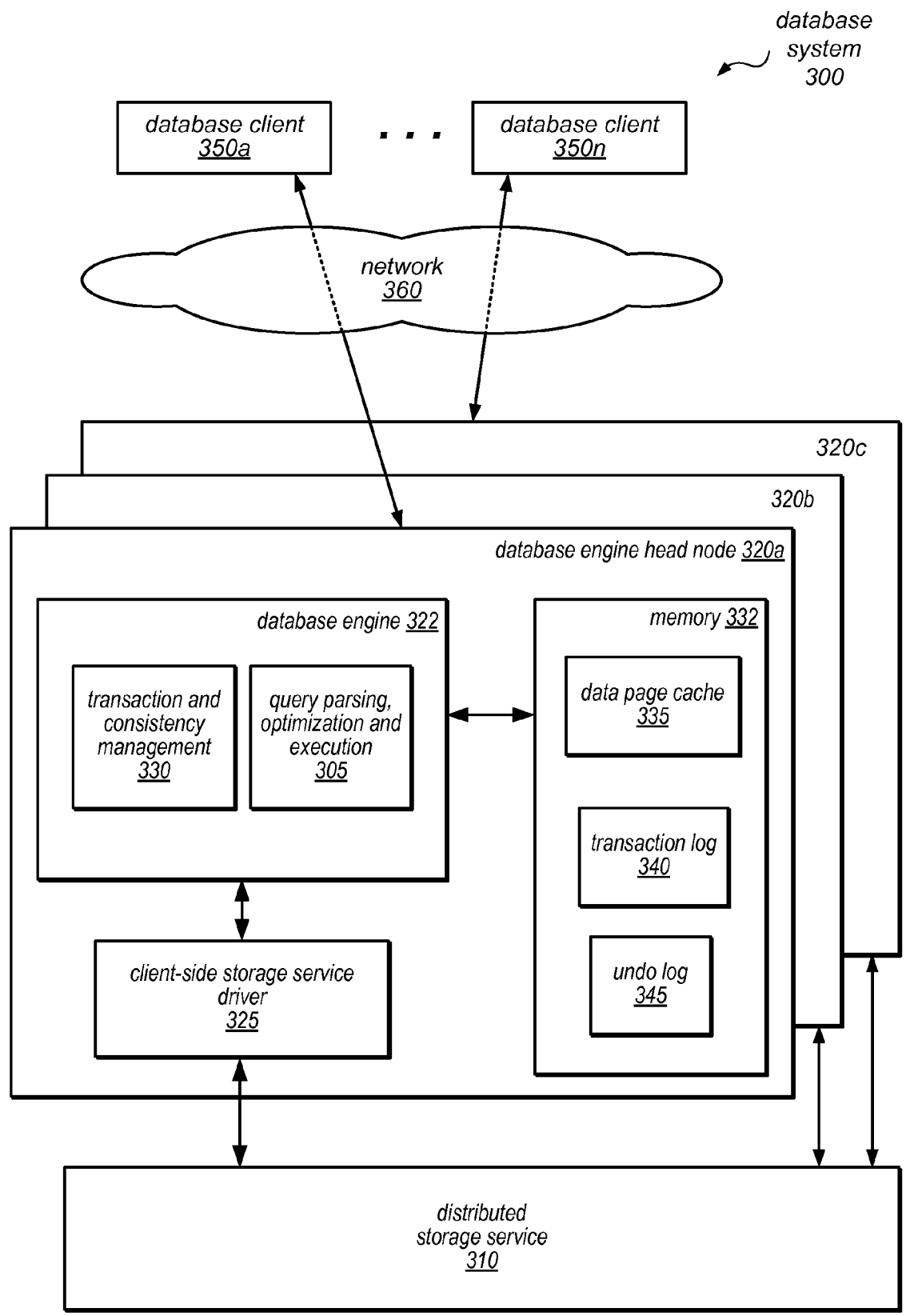
FIG. 3 is a block diagram illustrating various components of a database system that includes a database engine and a separate distributed storage service, according to some embodiments.

FIG. 3 is a block diagram illustrating various components of a database system that includes a database engine and a separate distributed database storage service, according to one embodiment. In this example, database system 300 includes a respective database engine head node 320 for each of several databases and a distributed storage service 310 (which may or may not be visible to the clients of the database system, shown as database clients 350a-350n). As illustrated in this example, one or more of database clients 350a-350n may access a database head node 320 (e.g., head node 320a, head node 320b, or head node 320c, each of which is a component of a respective database instance) via network 360 (e.g., these components may be network-addressable and accessible to the database clients 350a-350n). However, distributed storage service 310, which may be employed by the database system to store data pages of one or more databases (and redo log records and/or other metadata associated therewith) on behalf of database clients 350a-350n, and to perform other functions of the database system as described herein, may or may not be network-addressable and accessible to the storage clients 350a-350n, in different embodiments. For example, in some embodiments, distributed storage service 310 may perform various storage, access, change logging, recovery, log record manipulation, and/or space management operations in a manner that is invisible to storage clients 350a-350n.

As previously noted, each database instance may include a single database engine head node 320 that receives requests (e.g., a snapshot request, etc.) from various client programs (e.g., applications) and/or subscribers (users), then parses them, optimizes them, and develops an execution plan to carry out the associated database operation(s). In the example illustrated in FIG. 3, a query parsing, optimization, and execution component 305 of database engine head node 320a may perform these functions for queries that are received from database client 350a and that target the database instance of which database engine head node 320a is a component. In some embodiments, query parsing, optimization, and execution component 305 may return query responses to database client 350a, which may include write acknowledgements, requested data pages (or portions thereof), error messages, and or other responses, as appropriate. As illustrated in this example, database engine head node 320a may also include a client-side storage service driver 325, which may route read requests and/or redo log records to various storage nodes within distributed storage service 310, receive write acknowledgements from distributed storage service 310, receive requested data pages from distributed storage service 310, and/or return data pages, error messages, or other responses to query parsing, optimization, and execution component 305 (which may, in turn, return them to database client 350a). Client-side storage service driver 325 may, in some embodiments, determine whether a write quorum requirement for a log record or other write request is met. Similarly, client-side storage service driver 325 may implement any of the various dynamic utilization of bandwidth for quorum-based distributed storage systems described below, such as described with regard to FIGS. 9, 10, and 11.

In this example, database engine head node 320a includes a data page cache 335, in which data pages that were recently accessed may be temporarily held. As illustrated in FIG. 3, database engine head node 320a may also include a transaction and consistency management component 330, which may be responsible for providing transactionality and consistency in the database instance of which database engine head node 320a is a component. For example, this component may be responsible for ensuring the Atomicity, Consistency, and Isolation properties of the database instance and the transactions that are directed that the database instance. As illustrated in FIG. 3, database engine head node 320a may also include a transaction log 340 and an undo log 345, which may be employed by transaction and consistency management component 330 to track the status of various transactions and roll back any locally cached results of transactions that do not commit.

Note that each of the other database engine head nodes 320 illustrated in FIG. 3 (e.g., 320b and 320c) may include similar components and may perform similar functions for queries received by one or more of database clients 350a-350n and directed to the respective database instances of which it is a component.

In some embodiments, the distributed storage systems described herein may organize data in various logical volumes, segments, and pages for storage on one or more storage nodes. For example, in some embodiments, each database is represented by a logical volume, and each logical volume is segmented over a collection of storage nodes. Each segment, which lives on a particular one of the storage nodes, contains a set of contiguous block addresses. In some embodiments, each data page is stored in a segment, such that each segment stores a collection of one or more data pages and a change log (also referred to as a redo log) (e.g., a log of redo log records) for each data page that it stores. As described in detail herein, the storage nodes may be configured to receive redo log records (which may also be referred to herein as ULRs) and to coalesce them to create new versions of the corresponding data pages and/or additional or replacement log records (e.g., lazily and/or in response to a request for a data page or a database crash). In some embodiments, data pages and/or change logs may be mirrored across multiple storage nodes, according to a variable configuration, such as in a protection group (which may be specified by the client on whose behalf the databases are being maintained in the database system). For example, in different embodiments, one, two, or three copies of the data or change logs may be stored in each of one, two, or three different availability zones or regions, according to a default configuration, an application-specific durability preference, or a client-specified durability preference.

As used herein, the following terms may be used to describe the organization of data by a distributed storage system, according to various embodiments.

Volume: A volume is a logical concept representing a highly durable unit of storage that a user/client/application of the storage system understands. More specifically, a volume is a distributed store that appears to the user/client/application as a single consistent ordered log of write operations to various user pages of a database. Each write operation may be encoded in a User Log Record (ULR), which represents a logical, ordered mutation to the contents of a single user page within the volume. As noted above, a ULR may also be referred to herein as a redo log record. Each ULR may include a unique identifier (e.g., a Logical Sequence Number (LSN)). Each ULR may be persisted to one or more synchronous segments in the distributed store that form a Protection Group (PG), to provide high durability and availability for the ULR. A volume may provide an LSN-type read/write interface for a variable-size contiguous range of bytes.

In some embodiments, a volume may consist of multiple extents, each made durable through a protection group. In such embodiments, a volume may represent a unit of storage composed of a mutable contiguous sequence of Volume Extents. Reads and writes that are directed to a volume may be mapped into corresponding reads and writes to the constituent volume extents. In some embodiments, the size of a volume may be changed by adding or removing volume extents from the end of the volume.

Segment: A segment is a limited-durability unit of storage assigned to a single storage node. More specifically, a segment provides limited best-effort durability (e.g., a persistent, but non-redundant single point of failure that is a storage node) for a specific fixed-size byte range of data. This data may in some cases be a mirror of user-addressable data, or it may be other data, such as volume metadata or erasure coded bits, in various embodiments. A given segment may live on exactly one storage node. Within a storage node, multiple segments may live on each SSD, and each segment may be restricted to one SSD (e.g., a segment may not span across multiple SSDs). In some embodiments, a segment may not be required to occupy a contiguous region on an SSD; rather there may be an allocation map in each SSD describing the areas that are owned by each of the segments. As noted above, a protection group may consist of multiple segments spread across multiple storage nodes. In some embodiments, a segment may provide an LSN-type read/write interface for a fixed-size contiguous range of bytes (where the size is defined at creation). In some embodiments, each segment may be identified by a Segment UUID (e.g., a universally unique identifier of the segment).

Storage page: A storage page is a block of memory, generally of fixed size. In some embodiments, each page is a block of memory (e.g., of virtual memory, disk, or other physical memory) of a size defined by the operating system, and may also be referred to herein by the term "data block". More specifically, a storage page may be a set of contiguous sectors. It may serve as the unit of allocation in SSDs, as well as the unit in log pages for which there is a header and metadata. In some embodiments, and in the context of the database systems described herein, the term "page" or "storage page" may refer to a similar block of a size defined by the database configuration, which may typically a multiple of 2, such as 4096, 8192, 16384, or 32768 bytes.

Log page: A log page is a type of storage page that is used to store log records (e.g., redo log records or undo log records). In some embodiments, log pages may be identical in size to storage pages. Each log page may include a header containing metadata about that log page, e.g., metadata identifying the segment to which it belongs. Note that a log page is a unit of organization and may not necessarily be the unit of data included in write operations. For example, in some embodiments, during normal forward processing, write operations may write to the tail of the log one sector at a time.

Log Records: Log records (e.g., the individual elements of a log page) may be of several different classes. For example, User Log Records (ULRs), which are created and understood by users/clients/applications of the storage system, may be used to indicate changes to user data in a volume. Control Log Records (CLRs), which are generated by the storage system, may contain control information used to keep track of metadata such as the current unconditional volume durable LSN (VDL). Null Log Records (NLRs) may in some embodiments be used as padding to fill in unused space in a log sector or log page. In some embodiments, there may be various types of log records within each of these classes, and the type of a log record may correspond to a function that needs to be invoked to interpret the log record. For example, one type may represent all the data of a user page in compressed format using a specific compression format; a second type may represent new values for a byte range within a user page; a third type may represent an increment operation to a sequence of bytes interpreted as an integer; and a fourth type may represent copying one byte range to another location within the page. In some embodiments, log record types may be identified by GUIDs (rather than by integers or enums), which may simplify versioning and development, especially for ULRs.

Payload: The payload of a log record is the data or parameter values that are specific to the log record or to log records of a particular type. For example, in some embodiments, there may be a set of parameters or attributes that most (or all) log records include, and that the storage system itself understands. These attributes may be part of a common log record header/structure, which may be relatively small compared to the sector size. In addition, most log records may include additional parameters or data specific to that log record type, and this additional information may be considered the payload of that log record. In some embodiments, if the payload for a particular ULR is larger than the user page size, it may be replaced by an absolute ULR (an AULR) whose payload includes all the data for the user page. This may enable the storage system to enforce an upper limit on the size of the payload for ULRs that is equal to the size of user pages.

Note that when storing log records in the segment log, the payload may be stored along with the log header, in some embodiments. In other embodiments, the payload may be stored in a separate location, and pointers to the location at which that payload is stored may be stored with the log header. In still other embodiments, a portion of the payload may be stored in the header, and the remainder of the payload may be stored in a separate location. If the entire payload is stored with the log header, this may be referred to as in-band storage; otherwise the storage may be referred to as being out-of-band. In some embodiments, the payloads of most large AULRs may be stored out-of-band in the cold zone of log (which is described below).

User pages: User pages are the byte ranges (of a fixed size) and alignments thereof for a particular volume that are visible to users/clients of the storage system. User pages are a logical concept, and the bytes in particular user pages may or not be stored in any storage page as-is. The size of the user pages for a particular volume may be independent of the storage page size for that volume. In some embodiments, the user page size may be configurable per volume, and different segments on a storage node may have different user page sizes. In some embodiments, user page sizes may be constrained to be a multiple of the sector size (e.g., 4 KB), and may have an upper limit (e.g., 64 KB). The storage page size, on the other hand, may be fixed for an entire storage node and may not change unless there is a change to the underlying hardware.

Data page: A data page is a type of storage page that is used to store user page data in compressed form. In some embodiments every piece of data stored in a data page is associated with a log record, and each log record may include a pointer to a sector within a data page (also referred to as a data sector). In some embodiments, data pages may not include any embedded metadata other than that provided by each sector. There may be no relationship between the sectors in a data page. Instead, the organization into pages may exist only as an expression of the granularity of the allocation of data to a segment.

Storage node: A storage node is a single virtual machine that on which storage node server code is deployed. Each storage node may contain multiple locally attached SSDs, and may provide a network API for access to one or more segments. In some embodiments, various nodes may be on an active list or on a degraded list (e.g., if they are slow to respond or are otherwise impaired, but are not completely unusable). In some embodiments, the client-side driver may assist in (or be responsible for) classifying nodes as active or degraded, for determining if and when they should be replaced, and/or for determining when and how to redistribute data among various nodes, based on observed performance.

SSD: As referred to herein, the term "SSD" may refer to a local block storage volume as seen by the storage node, regardless of the type of storage employed by that storage volume, e.g., disk, a solid-state drive, a battery-backed RAM, a non-volatile RAM device (e.g., one or more NV-DIMMs) or another type of persistent storage device. An SSD is not necessarily mapped directly to hardware. For example, a single solid-state storage device might be broken up into multiple local volumes where each volume is split into and striped across multiple segments, and/or a single drive may be broken up into multiple volumes simply for ease of management, in different embodiments. In some embodiments, each SSD may store an allocation map at a single fixed location. This map may indicate which storage pages that are owned by particular segments, and which of these pages are log pages (as opposed to data pages). In some embodiments, storage pages may be pre-allocated to each segment so that forward processing may not need to wait for allocation. Any changes to the allocation map may need to be made durable before newly allocated storage pages are used by the segments.

Figure 4:
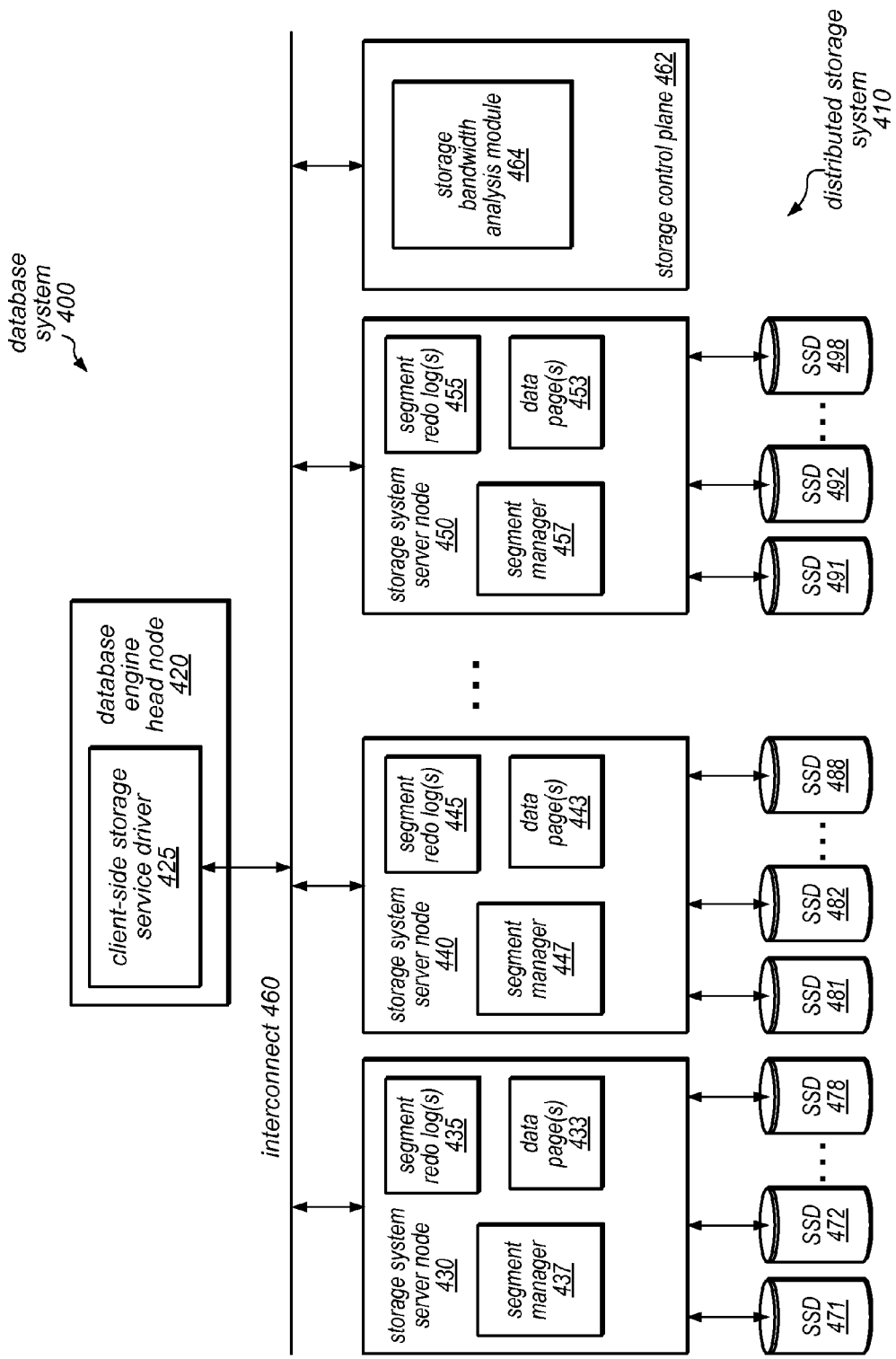
FIG. 4 is a block diagram illustrating a distributed storage system, according to some embodiments.

One embodiment of a distributed storage system is illustrated by the block diagram in FIG. 4. In at least some embodiments, storage nodes 430-450 may store data for different storage clients as part of a multi-tenant storage service. For example, the various segments discussed above and below with regard to FIG. 8, may correspond to different protection groups and volumes for different clients. As noted above, some storage nodes may perform garbage collection independent from other storage nodes. Consider the scenario where a storage node maintains data for two different clients. One client's data may be actively accessed/modified, causing the log structure for that data to grow quickly. Though, the other data maintained for the other client may be accessed infrequently, garbage collection may be performed to reclaim log pages associated with the other data in order to make more data pages available for the more active log.

In some embodiments, a database system 400 may be a client of distributed storage system 410, which communicates with a database engine head node 420 over interconnect 460. As in the example illustrated in FIG. 3, database engine head node 420 may include a client-side storage service driver 425. In this example, distributed storage system 410 includes multiple storage system server nodes (including those shown as 430, 440, and 450), each of which includes storage for data pages and redo logs for the segment(s) it stores, and hardware and/or software configured to perform various segment management functions. For example, each storage system server node may include hardware and/or software configured to perform at least a portion of any or all of the following operations: replication (locally, e.g., within the storage node), coalescing of redo logs to generate data pages, snapshots (e.g., creating, restoration, deletion, etc.), log management (e.g., manipulating log records), crash recovery, and/or space management (e.g., for a segment). Each storage system server node may also have multiple attached storage devices (e.g., SSDs) on which data blocks may be stored on behalf of clients (e.g., users, client applications, and/or database service subscribers).

In the example illustrated in FIG. 4, storage system server node 430 includes data page(s) 433, segment redo log(s) 435, segment management functions 437, and attached SSDs 471-478. Again note that the label "SSD" may or may not refer to a solid-state drive, but may more generally refer to a local block storage volume, regardless of its underlying hardware. Similarly, storage system server node 440 includes data page(s) 443, segment redo log(s) 445, segment management functions 447, and attached SSDs 481-488; and storage system server node 450 includes data page(s) 453, segment redo log(s) 455, segment management functions 457, and attached SSDs 491-498.

As previously noted, in some embodiments, a sector is the unit of alignment on an SSD and may be the maximum size on an SSD that can be written without the risk that the write will only be partially completed. For example, the sector size for various solid-state drives and spinning media may be 4 KB. In some embodiments of the distributed storage systems described herein, each and every sector may include have a 64-bit (8 byte) CRC at the beginning of the sector, regardless of the higher-level entity of which the sector is a part. In such embodiments, this CRC (which may be validated every time a sector is read from SSD) may be used in detecting corruptions. In some embodiments, each and every sector may also include a "sector type" byte whose value identifies the sector as a log sector, a data sector, or an uninitialized sector. For example, in some embodiments, a sector type byte value of 0 may indicate that the sector is uninitialized.

In some embodiments, each of the storage system server nodes in the distributed storage system may implement a set of processes running on the node server's operating system that manage communication with the database engine head node, e.g., to receive redo logs, send back data pages, etc. In some embodiments, all data blocks written to the distributed storage system may be backed up to long-term and/or archival storage (e.g., in a remote key-value durable backup storage system).

Distributed storage system 410 may also implement a storage control plane 462. Storage control plane may be one or more compute nodes configured to perform a variety of different storage system management functions. For example, storage control plane may implement a volume manager, which may be configured to maintain mapping information for a volume as it is persisted in varying different, extents, segments, and protection groups. A volume manager may be configured to communicate with a client of storage system 410, such as client-side driver 425 in order to "mount" the volume for the client, providing client-side driver 425 with mapping information, protection group policies, and various other information necessary to send write and read requests to storage nodes 430-450. Storage control plane 462 may also implement storage bandwidth analysis module 464.

Storage bandwidth analysis module 464 may, in some embodiments, implement real-time monitoring, or various other data collection techniques to dynamically evaluate the health or cost of distributed storage system 410. For example, storage bandwidth module may measure the number access requests to particular storage system server nodes and thus detect changes in the network utilization (e.g. via interconnect 460) among the storage system server nodes. Similarly, storage bandwidth analysis module may evaluate the performance of particular storage system server nodes (e.g., examine the lag between a log record persisted at one storage node versus another storage node). Determined latencies for prior write requests may also be collected. Storage bandwidth analysis module 464 may store the collected data for analysis. For example, in some embodiments, machine learning techniques may be used to determine various tuning actions to make with respect to bandwidth for distributed storage system. Behavior or traffic patterns similar to historical data previously may indicate that a latency threshold used by client-side storage service driver 425 may need to be adjusted to more efficiently utilize bandwidth among the storage system server nodes (e.g., by increasing or decreasing the threshold for under or overburdened storage systems).

Various storage system health or cost indicators (indicating changes in the health/cost or corrective/tuning actions to be taken) may be generated by storage bandwidth analysis module 464 and sent to other components in the distributed storage system, such as storage system server nodes 430-450 for performing the various dynamic utilization of bandwidth techniques discussed below. Storage system health or cost indicators may also be sent to client-side service driver 425 or other storage system clients in order to direct or provide further information implementing dynamic utilization of bandwidth for quorum-based distributed storage systems.

Figure 5:
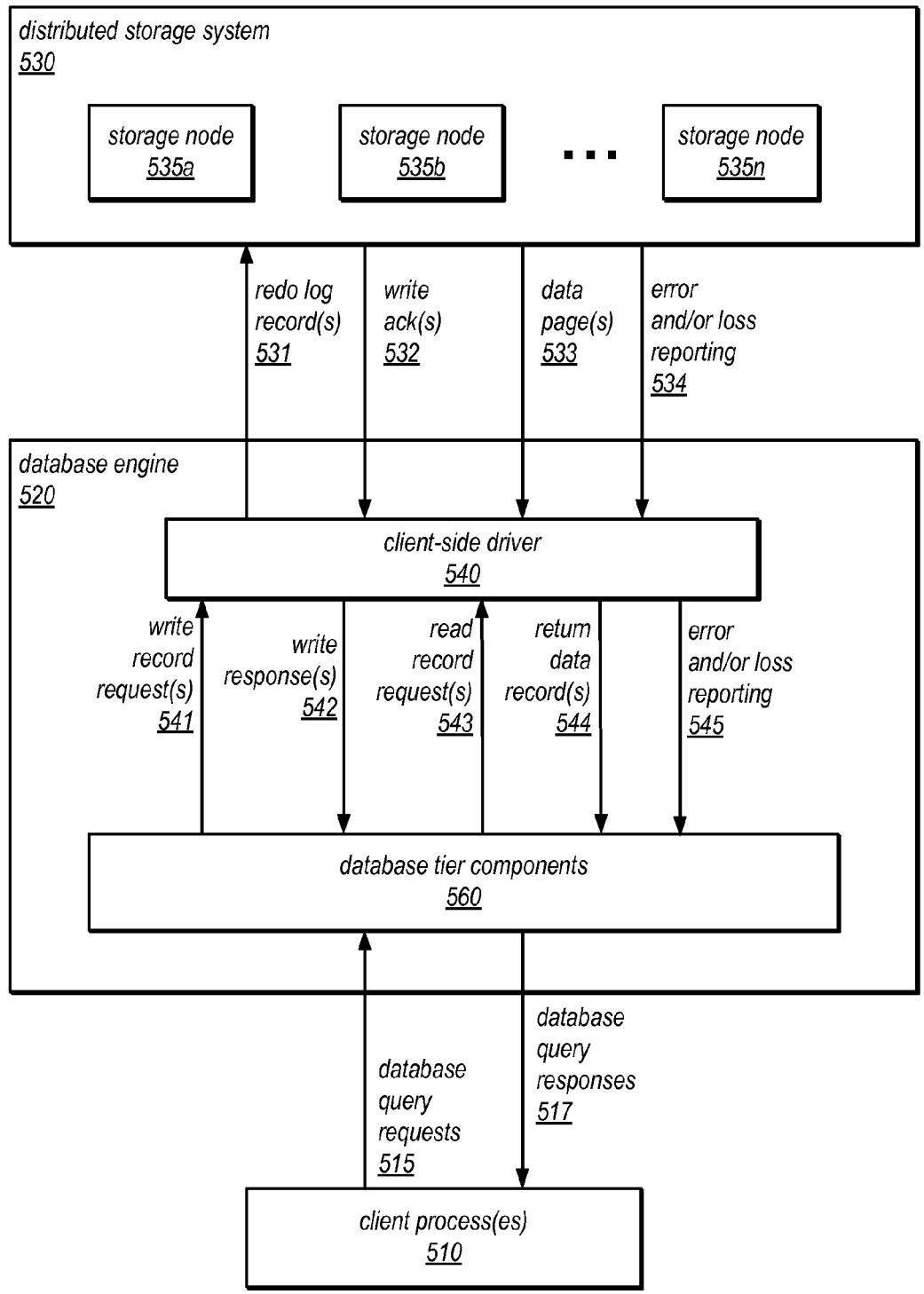
FIG. 5 is a block diagram illustrating the use of a separate distributed storage system in a database system, according to some embodiments.

FIG. 5 is a block diagram illustrating the use of a separate distributed storage system in a database system, according to one embodiment. In this example, one or more client processes 510 may store data to one or more databases maintained by a database system that includes a database engine 520 and a distributed storage system 530. In the example illustrated in FIG. 5, database engine 520 includes database tier components 560 and client-side driver 540 (which serves as the interface between distributed storage system 530 and database tier components 560). In some embodiments, database tier components 560 may perform functions such as those performed by query parsing, optimization and execution component 305 and transaction and consistency management component 330 of FIG. 3, and/or may store data pages, transaction logs and/or undo logs (such as those stored by data page cache 335, transaction log 340 and undo log 345 of FIG. 3).

In this example, one or more client processes 510 may send database query requests 515 (which may include read and/or write requests targeting data stored on one or more of the storage nodes 535a-535n) to database tier components 560, and may receive database query responses 517 from database tier components 560 (e.g., responses that include write acknowledgements and/or requested data). Each database query request 515 that includes a request to write to a data page may be parsed and optimized to generate one or more write record requests 541, which may be sent to client-side driver 540 for subsequent routing to distributed storage system 530. In this example, client-side driver 540 may generate one or more redo log records 531 corresponding to each write record request 541, and may send them to specific ones of the storage nodes 535 of distributed storage system 530. Client-side driver 540 may determine which storage nodes to send redo log records in a particular protection group according to the various techniques discussed below with regard to FIGS. 9-11. For example, instead of sending a redo log record 531 to all storage nodes in a protection group, the redo log record may be sent to one, two, or any other subset of storage nodes in the protection group, thus saving network bandwidth directed toward distributed storage system 530. Client-side driver 540 may also determine when to send redo log records to additional storage nodes that were not previously sent the redo log record (such as in response to detecting that a pending write time for a log record has exceeded a latency threshold).

Distributed storage system 530 may return a corresponding write acknowledgement 523 for each redo log record 531 to database engine 520 (specifically to client-side driver 540). Client-side driver 540 may pass these write acknowledgements to database tier components 560 (as write responses 542), which may then send corresponding responses (e.g., write acknowledgements) to one or more client processes 510 as one of database query responses 517.

In this example, each database query request 515 that includes a request to read a data page may be parsed and optimized to generate one or more read record requests 543, which may be sent to client-side driver 540 for subsequent routing to distributed storage system 530. In this example, client-side driver 540 may send these requests to specific ones of the storage nodes 535 of distributed storage system 530, and distributed storage system 530 may return the requested data pages 533 to database engine 520 (specifically to client-side driver 540). Client-side driver 540 may send the returned data pages to the database tier components 560 as return data records 544, and database tier components 560 may then send the data pages to one or more client processes 510 as database query responses 517.

In some embodiments, various error and/or data loss messages 534 may be sent from distributed storage system 530 to database engine 520 (specifically to client-side driver 540). These messages may be passed from client-side driver 540 to database tier components 560 as error and/or loss reporting messages 545, and then to one or more client processes 510 along with (or instead of) a database query response 517.

In some embodiments, the APIs 531-534 of distributed storage system 530 and the APIs 541-545 of client-side driver 540 may expose the functionality of the distributed storage system 530 to database engine 520 as if database engine 520 were a client of distributed storage system 530. For example, database engine 520 (through client-side driver 540) may write redo log records or request data pages through these APIs to perform (or facilitate the performance of) various operations of the database system implemented by the combination of database engine 520 and distributed storage system 530 (e.g., storage, access, change logging, recovery, and/or space management operations). As illustrated in FIG. 5, distributed storage system 530 may store data blocks on storage nodes 535a-535n, each of which may have multiple attached SSDs. In some embodiments, distributed storage system 530 may provide high durability for stored data block through the application of various types of redundancy schemes.

Note that in various embodiments, the API calls and responses between database engine 520 and distributed storage system 530 (e.g., APIs 531-534) and/or the API calls and responses between client-side driver 540 and database tier components 560 (e.g., APIs 541-545) in FIG. 5 may be performed over a secure proxy connection (e.g., one managed by a gateway control plane), or may be performed over the public network or, alternatively, over a private channel such as a virtual private network (VPN) connection. These and other APIs to and/or between components of the database systems described herein may be implemented according to different technologies, including, but not limited to, Simple Object Access Protocol (SOAP) technology and Representational state transfer (REST) technology. For example, these APIs may be, but are not necessarily, implemented as SOAP APIs or RESTful APIs. SOAP is a protocol for exchanging information in the context of network-based services. REST is an architectural style for distributed hypermedia systems. A RESTful API (which may also be referred to as a RESTful network-based service) is a network-based service API implemented using HTTP and REST technology. The APIs described herein may in some embodiments be wrapped with client libraries in various languages, including, but not limited to, C, C++, Java, C# and Perl to support integration with database engine 520 and/or distributed storage system 530.

Figure 6:
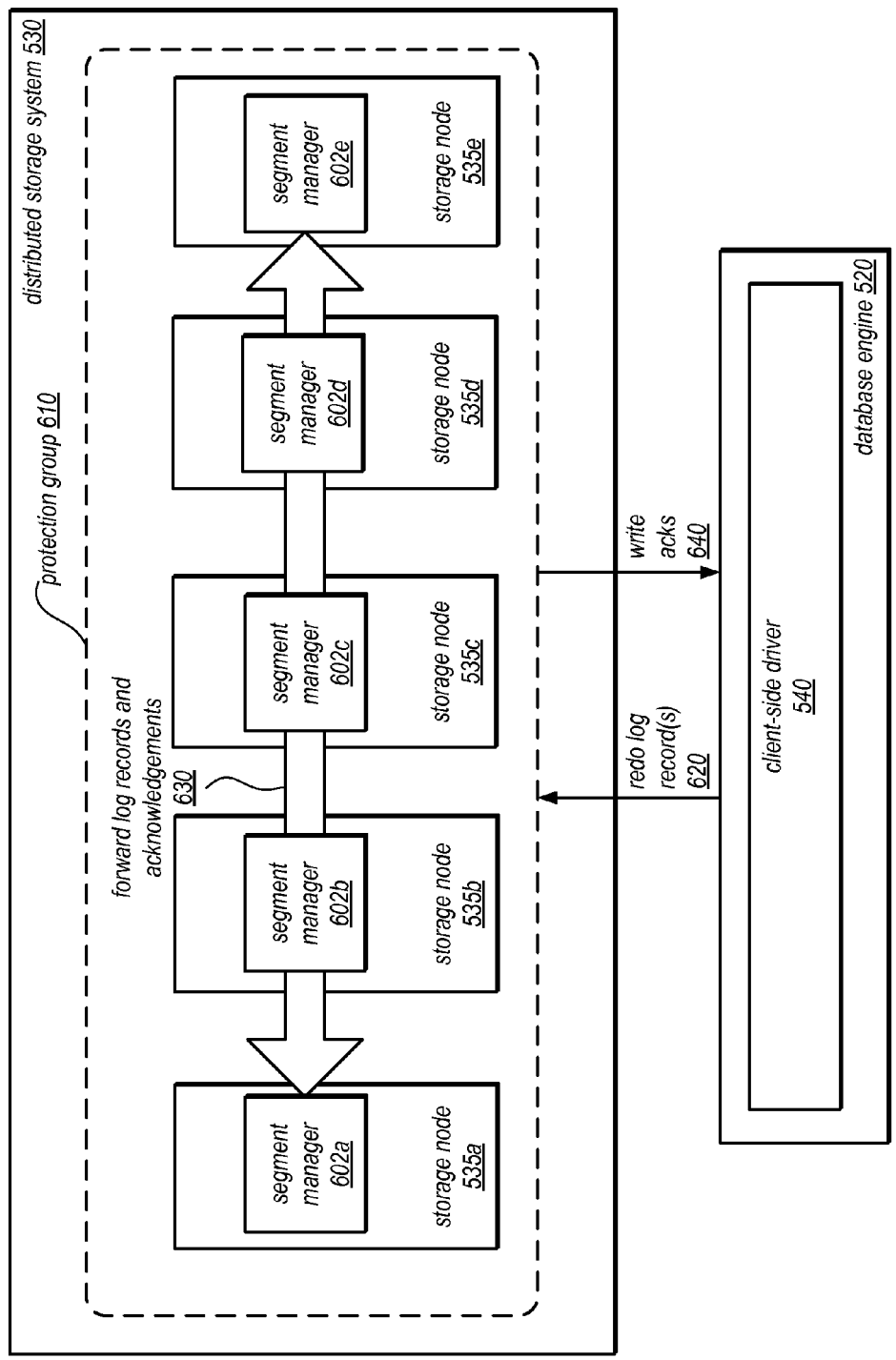
FIG. 6 is a block diagram illustrating the use of a distributed storage system that implements various different methods and techniques for dynamically utilizing bandwidth, according to some embodiments.

As noted above, in some embodiments, distributed storage system 530 may implement various replication and forwarding protocols among storage nodes of a distributed storage system. These replication and forwarding protocols may be implementing as part of dynamically utilizing bandwidth for a quorum-based distributed storage system. FIG. 6 a block diagram illustrating the use of a distributed storage system that implements various different methods and techniques for dynamically utilizing bandwidth, according to some embodiments.

Similar to FIG. 5 above, client-side driver 540 may send redo log records to different storage nodes 535 in distributed storage system 530. Redo log records 620 may pertain to or be associated with data maintained by a protection group 610, which includes member storage nodes 535a, 535b, 535c, 535d, and 535e. Redo log records may need to a satisfy a write quorum requirement for protection group 610 in order for a log record to be made durable.

Each storage node may implement a corresponding segment manager, 602a, 602b, 602c, 602d, and 602e. Segment managers 602 may, in some embodiments, be responsible for acknowledging writes 640 as completed, performed, etc. at each respective storage node. In some embodiments, storage nodes may also be configured to determine other storage nodes that have not received a redo log record 620, and send the log record to the other storage node to be performed. For example, storage node 535a may receive a redo log record 620. Segment manager 602a may also receive broadcast communications from other storage nodes 535b-535e in protection group 610 that indicate which redo log records have been received and maintained. Based on these communications, segment manager 602a may determine that storage node 535b does not have the redo log record 620. Segment manager 602a may forward the log record 630 to storage node 535b to be performed. An acknowledgment 630 of the redo log record at 535b may be sent back to storage node 535a via segment manager 602b. Segment manager 602a may then send an acknowledgment 640 to client-side driver 540 of the redo log record for both storage node 535a and storage node 535b.

As depicted in FIG. 6, storage nodes 535 in protection group 610 may forward log records and acknowledgments 630 to one another in order to satisfy a write quorum requirement for respective log records sent to the protection group. In at least some embodiments, records may be forwarded according to the various techniques illustrated below with regard to FIG. 12. For example, in some embodiments, a latency threshold may need to be exceeded at a storage node before a log record is forwarded to other storage nodes. In some embodiments, storage nodes in a protection group may only be able to communicate or forward log records to certain other storage nodes in a protection group, such as storage nodes within the same availability zone. Acknowledgments 640 sent to client-side driver may also indicate that a write quorum requirement for a particular log record is satisfied. For instance, a segment manager may be able to determine via the broadcasted information of other storage nodes that enough storage nodes have received the log record.

FIG. 6 is merely provided as an illustration only, and is not intended to be limiting as to the number or configuration of storage nodes in a protection group. As noted above, different write quorum requirements, as well as different architectures of distributed storage systems may implement different arrangements and/or communication channels between distributed storage system components, and thus, the previous example is not intended to be limiting.

Data may be stored at storage nodes using a number of different techniques. A variety of different allocation models, for instance, may be implemented for an SSD, in different embodiments. For example, in some embodiments, log entry pages and physical application pages may be allocated from a single heap of pages associated with an SSD device. This approach may have the advantage of leaving the relative amount of storage consumed by log pages and data pages to remain unspecified and to adapt automatically to usage. It may also have the advantage of allowing pages to remain unprepared until they are used, and repurposed at will without preparation. In other embodiments, an allocation model may partition the storage device into separate spaces for log entries and data pages. Once such allocation model is illustrated by the block diagram in FIG. 7 and described below.

Figure 7:
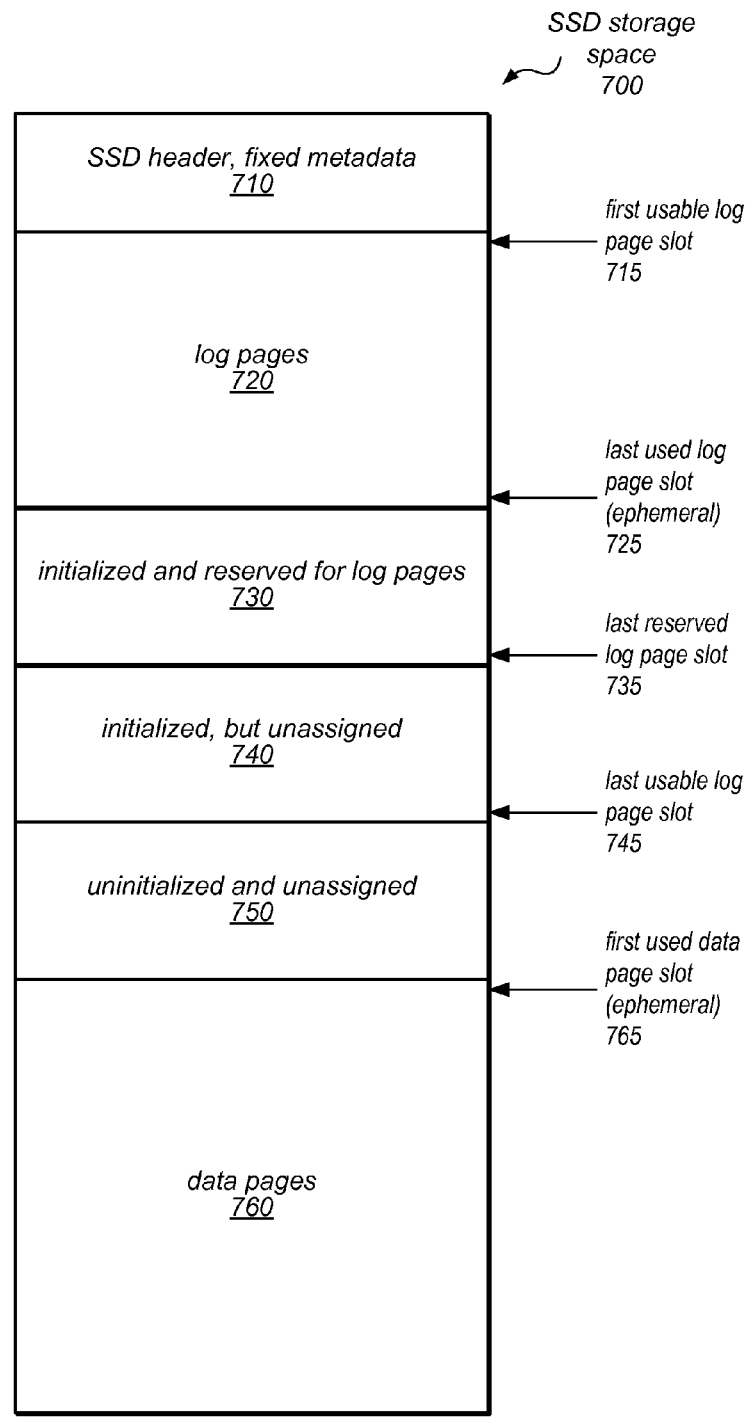
FIG. 7 is a block diagram illustrating how data and metadata may be stored on a storage node of a distributed storage system, according to some embodiments.

FIG. 7 is a block diagram illustrating how data and metadata may be stored on a given storage node (or persistent storage device) of a distributed storage system, according to one embodiment. In this example, SSD storage space 700 stores an SSD header and other fixed metadata in the portion of the space labeled 710. It stores log pages in the portion of the space labeled 720, and includes a space labeled 730 that is initialized and reserved for additional log pages. One portion of SSD storage space 700 (shown as 740) is initialized, but unassigned, and another portion of the space (shown as 750) is uninitialized and unassigned. Finally, the portion of SSD storage space 700 labeled 760 stores data pages.

In this example, the first usable log page slot is noted as 715, and the last used log page slot (ephemeral) is noted as 725. The last reserved log page slot is noted as 735, and the last usable log page slot is noted as 745. In this example, the first used data page slot (ephemeral) is noted as 765. In some embodiments, the positions of each of these elements (715, 725, 735, 745, and 765) within SSD storage space 700 may be identified by a respective pointer.

In allocation approach illustrated in FIG. 7, valid log pages may be packed into the beginning of the flat storage space. Holes that open up due to log pages being freed may be reused before additional log page slots farther into the address space are used. For example, in the worst case, the first n log page slots contain valid log data, where n is the largest number of valid log pages that have ever simultaneously existed. In this example, valid data pages may be packed into the end of the flat storage space. Holes that open up due to data pages being freed may be reused before additional data page slots lower in the address space are used. For example, in the worst case, the last m data pages contain valid data, where m is the largest number of valid data pages that have ever simultaneously existed.

In some embodiments, before a log page entry slot can become part of the potential set of valid log page entries, it may need to be initialized to a value that cannot be confused for a valid future log entry page. This is implicitly true for recycled log page slots, since a retired log page has enough metadata to never be confused for a new valid log page. However, when a storage device is first initialized, or when space is reclaimed that had potentially been used to store application data pages, the log page slots may need to be initialized before they are added to the log page slot pool. In some embodiments, rebalancing/reclaiming log space may be performed as a background task.

In the example illustrated in FIG. 7, the current log page slot pool includes the area between the first usable log page slot (at 715) and the last reserved log page slot (725). In some embodiments, this pool may safely grow up to last usable log page slot (725) without re-initialization of new log page slots (e.g., by persisting an update to the pointer that identifies the last reserved log page slot, 735). In this example, beyond the last usable log page slot (which is identified by pointer 745), the pool may grow up to the first used data page slot (which is identified by pointer 765) by persisting initialized log page slots and persistently updating the pointer for the last usable log page slot (745). In this example, the previously uninitialized and unassigned portion of the SSD storage space 700 shown as 750 may be pressed into service to store log pages. In some embodiments, the current log page slot pool may be shrunk down to the position of the last used log page slot (which is identified by pointer) by persisting an update to the pointer for the last reserved log page slot (735).

In the example illustrated in FIG. 7, the current data page slot pool includes the area between the last usable log page slot (which is identified by pointer 745) and the end of SSD storage space 700. In some embodiments, the data page pool may be safely grown to the position identified by the pointer to the last reserved log page slot (735) by persisting an update to the pointer to the last usable log page slot (745). In this example, the previously initialized, but unassigned portion of the SSD storage space 700 shown as 740 may be pressed into service to store data pages. Beyond this, the pool may be safely grown to the position identified by the pointer to the last used log page slot (725) by persisting updates to the pointers for the last reserved log page slot (735) and the last usable log page slot (745), effectively reassigning the portions of SSD storage space 700 shown as 730 and 740 to store data pages, rather than log pages. In some embodiments, the data page slot pool may be safely shrunk down to the position identified by the pointer to the first used data page slot (765) by initializing additional log page slots and persisting an update to the pointer to the last usable log page slot (745).

In embodiments that employ the allocation approach illustrated in FIG. 7, page sizes for the log page pool and the data page pool may be selected independently, while still facilitating good packing behavior. In such embodiments, there may be no possibility of a valid log page linking to a spoofed log page formed by application data, and it may be possible to distinguish between a corrupted log and a valid log tail that links to an as-yet-unwritten next page. In embodiments that employ the allocation approach illustrated in FIG. 7, at startup, all of the log page slots up to the position identified by the pointer to the last reserved log page slot (735) may be rapidly and sequentially read, and the entire log index may be reconstructed (including inferred linking/ordering). In such embodiments, there may be no need for explicit linking between log pages, since everything can be inferred from LSN sequencing constraints.

In some embodiments, a segment may consist of three main parts (or zones): one that contains a hot log, one that contains a cold log, and one that contains user page data. Zones are not necessarily contiguous regions of an SSD. Rather, they can be interspersed at the granularity of the storage page. In addition, there may be a root page for each segment that stores metadata about the segment and its properties. For example, the root page for a segment may store the user page size for the segment, the number of user pages in the segment, the current beginning/head of the hot log zone (which may be recorded in the form of a flush number), the volume epoch, and/or access control metadata.

Figure 8:
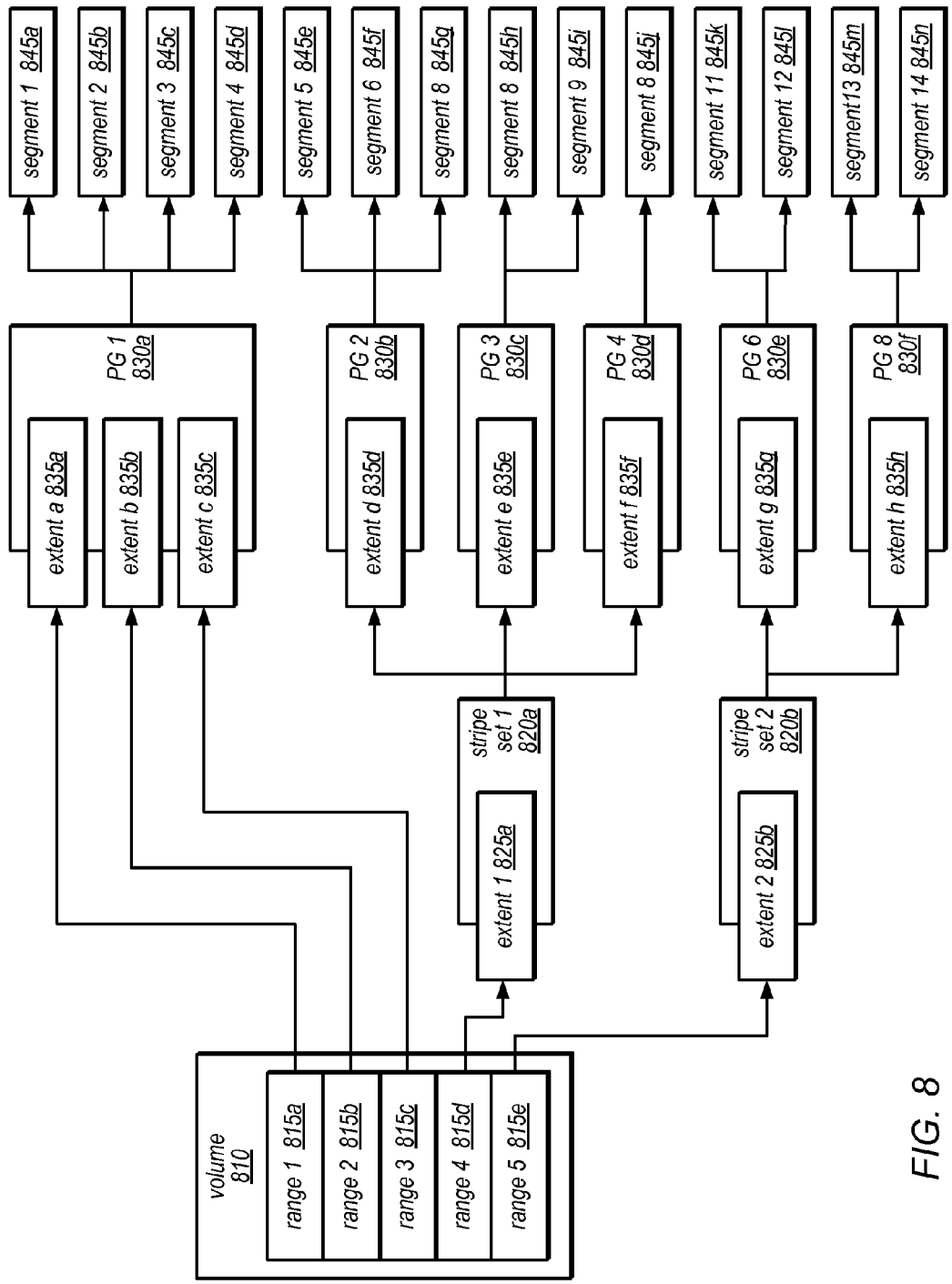
FIG. 8 is a block diagram illustrating an example configuration of a database volume, according to some embodiments.

FIG. 8 is a block diagram illustrating an example configuration of a database volume 710, according to one embodiment. In this example, data corresponding to each of various address ranges 815 (shown as address ranges 815a-815e) is stored as different segments 845 (shown as segments 845a-845n). More specifically, data corresponding to each of various address ranges 815 may be organized into different extents (shown as extents 825a-825b, and extents 835a-835h), and various ones of these extents may be included in different protection groups 830 (shown as 830a-830f), with or without striping (such as that shown as stripe set 820a and stripe set 820b). In this example, protection group 1 illustrates the use of erasure coding. In this example, protection groups 2 and 3 and protection groups 6 and 8 represent mirrored data sets of each other, while protection group 4 represents a single-instance (non-redundant) data set. In this example, protection group 8 represents a multi-tier protection group that combines other protection groups (e.g., this may represent a multi-region protection group). In this example, stripe set 1 (820a) and stripe set 2 (820b) illustrates how extents (e.g., extents 825a and 825b) may be striped into a volume, in some embodiments.

More specifically, in this example, protection group 1 (830a) includes extents a-c (835a-835c), which include data from ranges 1-3 (815a-815c), respectively, and these extents are mapped to segments 1-4 (845a-845d). Protection group 2 (830b) includes extent d (835d), which includes data striped from range 4 (815d), and this extent is mapped to segments 5-7 (845e-845g). Similarly, protection group 3 (830c) includes extent e (835e), which includes data striped from range 4 (815d), and is mapped to segments 8-9 (845h-845i); and protection group 4 (830d) includes extent f (835f), which includes data striped from range 4 (815d), and is mapped to segment 10 (845j). In this example, protection group 6 (830e) includes extent g (835g), which includes data striped from range 5 (815e), and is mapped to segments 11-12 (845k-845l); and protection group 7 (830f) includes extent h (835h), which also includes data striped from range 5 (815e), and is mapped to segments 13-14 (845m-845n).

The distributed storage service and database service discussed in FIGS. 2 through 8 above represent some of the various different interactions between a storage client, such as a database system, and a quorum-based distributed storage system implementing dynamic utilization of bandwidth. Both the storage client and/or the distributed storage system may implement part or all of different techniques to dynamically utilize bandwidth in a quorum-based distributed storage system. The following discussion provides examples of different methods and techniques that may be performed by different systems or devices in the example services presented above (individually or in concert), or other databases, storage clients, or quorum-based distributed storage systems.

Figure 9:
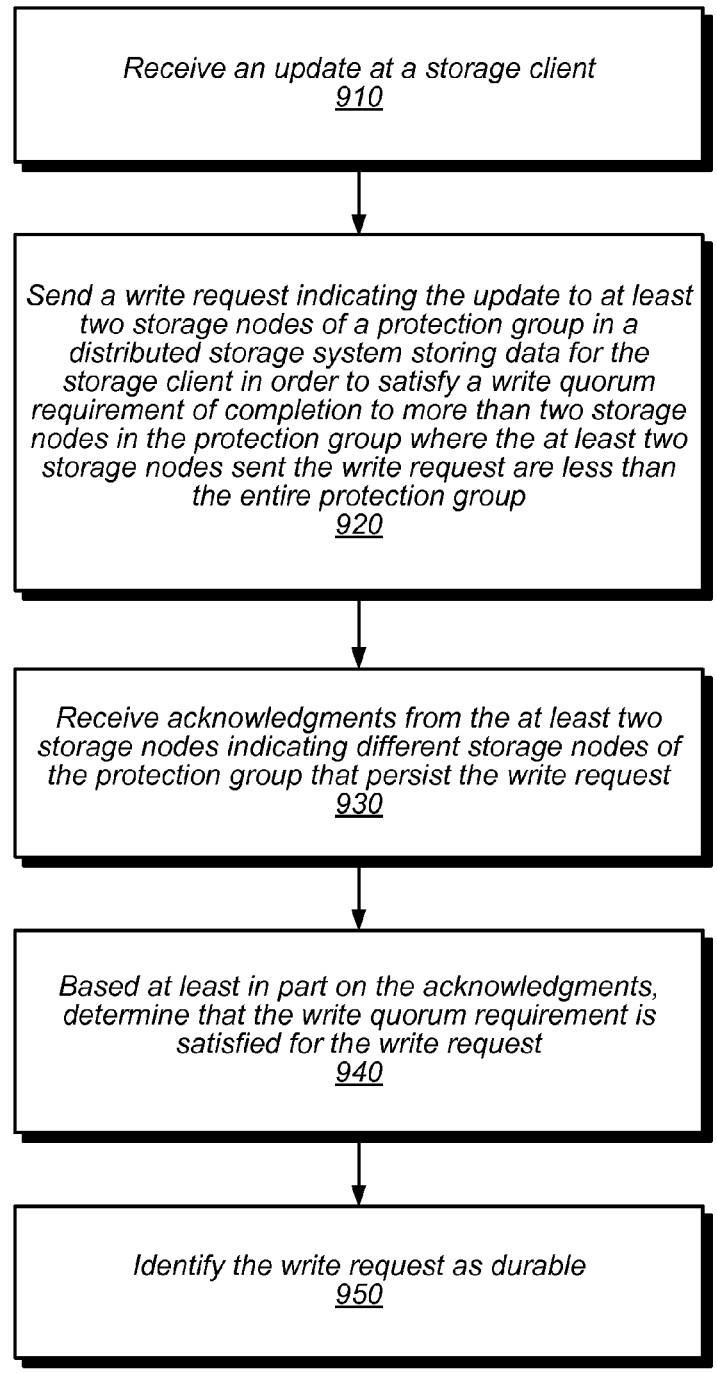
FIG. 9 is a high-level flowchart illustrating various techniques for a storage client implementing dynamically optimized bandwidth for a quorum-based, distributed storage system, according to some embodiments.

FIG. 9 is a high-level flowchart illustrating various techniques for a storage client implementing dynamically optimized bandwidth for a quorum-based, distributed storage system, according to some embodiments. As indicated at 910, an update may be received at a storage client, in various embodiments. Similar to the network-based database service described above, a storage client may access data stored for the storage client at a distributed storage system, such as the network-based distributed storage service also described above. The update may be simply a request to modify a particular value for a particular record maintained for the storage client, or may be one of many different changes in a complex and/or far reaching transaction that updates a large amount of records/data. More generally, an update may be any change, modification, or other transformation of data stored for the storage client. In response to the update, at least one (and possibly many) write requests may be generated. A write request (as noted above) may indicate the update (or a portion of the update) to data stored for the data base at the distributed storage system. In at least some embodiments, the write request may be a log record (such as a redo log record).

The write request may be sent, as indicated at 920, to at least two storage nodes in a protection group of storage nodes storing data for the storage client. These at least two storage nodes may not, in some embodiments, satisfy a write quorum requirement for the database alone. As discussed above, with regard to FIG. 1, a write quorum requirement may be any combination of storage nodes in a protection group, such as a minimum number of storage nodes and/or storage nodes in a particular location (e.g., an availability zone). Although one or both of the two storage nodes may, in some embodiments, be necessary to satisfy the write quorum requirement, they may not necessarily be sufficient. Other remaining nodes in the protection group may also need to complete the write request in order to satisfy the write quorum requirement. Thus, the write quorum requirement may include more than two storage nodes in order to be satisfied. The at least two storage nodes may also, in some embodiments, be less than the entire protection group. For example, if the write request is sent to two storage nodes, then the protection group may have at least 3 storage nodes. Similarly, if the write request is sent to at least 3 storage nodes, then the protection group may have at least 4 storage nodes.

The at least two storage nodes to send the write request to may be determined in many different ways. For example, various different analysis techniques of the health/cost or state of the protection group storage nodes either as a whole, or individually may be considered, as is discussed in above with regard to FIG. 4 and below with regard to FIG. 12. The architecture or physical schema of the distributed storage system may also be considered when identifying storage nodes to send the write request to. For example, communication channels (e.g., external network connections) between one availability zone and another (which may be in a different physical location) may be of limited bandwidth or capacity. In some embodiments, for instance, storage nodes implemented in an availability zone different from other storage nodes in the protection group, or a database node or storage client, may be significantly more costly to utilize than sending write requests to storage nodes within the same availability zone.

The at least two storage nodes sent the write request may then perform various forwarding and/or replication techniques, such as those discussed above with regard to FIG. 6, and below with regard to FIG. 12. For example, storage nodes of a protection group may broadcast log records received and persisted at the particular storage node to other storage nodes in the protection group. Based, on these broadcasts, a storage node may be able to determine whether to forward received write requests to other storage nodes, or to request write requests from other storage nodes in order to complete them. Storage nodes may also, in some embodiments, forward write requests to those storage nodes who do not broadcast or advertise maintaining a write request while still within a latency threshold for the write request.

Similarly, although not illustrated in FIG. 9, in some embodiments the current write pending time for the write request may be maintained, calculated, or determined. The current write pending time may be compared to a latency threshold for the write request (which may be common to all write requests sent to the distributed storage system, or specific to certain write requests). If the current write pending time exceeds the latency threshold, then one or more of the remaining storage nodes in the protection group may be sent may the write request as well.

In various embodiments, acknowledgments may then be received from the at least two storage nodes indicating different storage nodes that have completed (or maintained or persisted) the write request, as indicated at 930. These acknowledgments may include an acknowledgment of the write request's completion on the responding storage node as well as other storage nodes. In some embodiments, the other storage nodes may be storage nodes to which the responding storage node forwarded the write request and received back from the storage node a response/acknowledgement indicating the persistence of the storage node. The other storage nodes may also be, in some embodiments, storage nodes that the responding storage node detected as having broadcast receiving the write request, which due to a dropped packet or other network error, the database may have not received.

As indicated at 940, based, at least in part, on the received acknowledgments, the write quorum requirement may be determined to be satisfied for the write request, as indicated at 940. Such a determination may be made by identifying the storage nodes in the protection group (as indicated in the acknowledgments) as having persisted the change in the write request and then comparing it to the write quorum requirement for the write request. Thus, if at least two storage nodes from 2 different availability zones are required to satisfy write quorum, then the acknowledgments may be evaluated to identify whether or not such storage nodes have acknowledged completing the write request. In some embodiments, acknowledgments received from the storage nodes may also indicate whether or not a write quorum has been satisfied for a particular write request.

Once the write request has been determined to be satisfied, the write request may be identified as durable, as indicated at 950. In various embodiments, committing a write request to the storage client may including sending an acknowledgment to an application or other client that instigated the write request (e.g., a database engine) so that the application may be aware of the write's durability in the distributed storage system.

Figure 10:
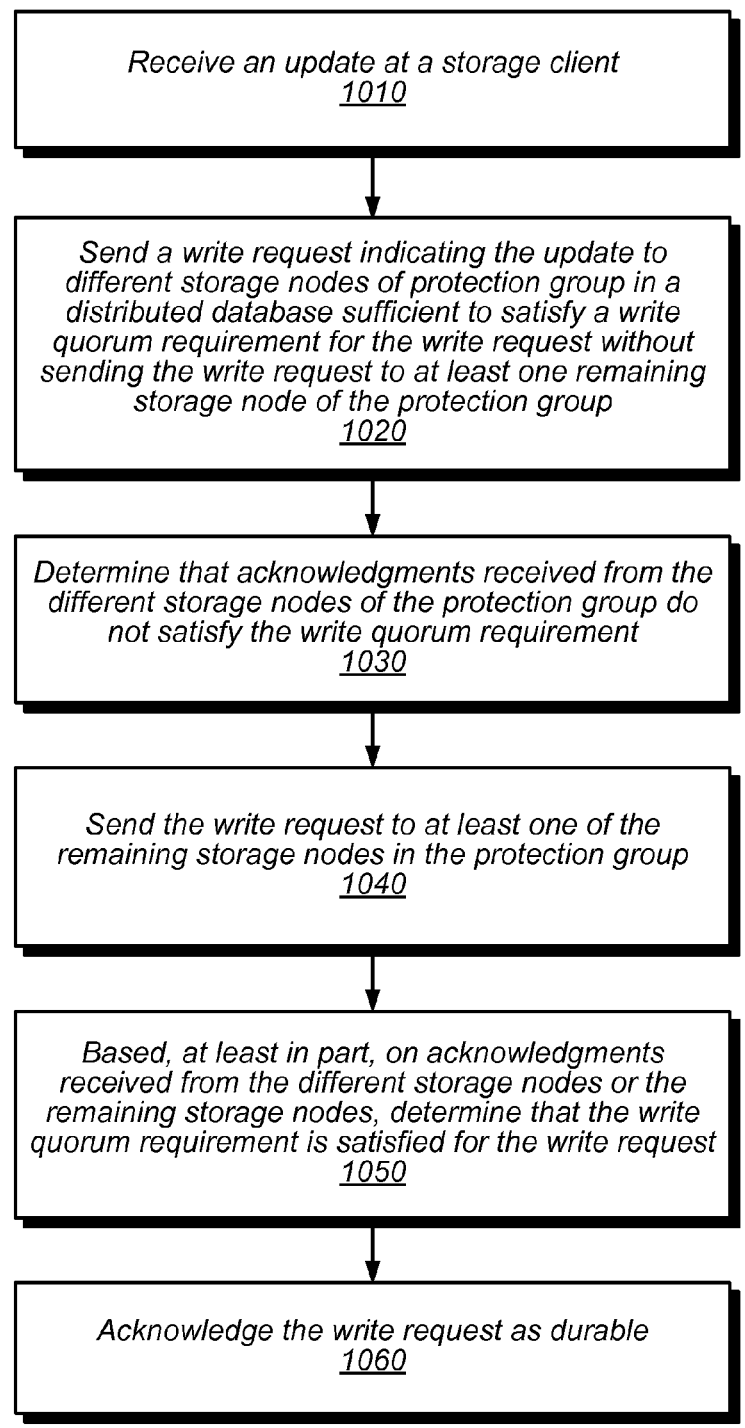
FIG. 10 is a high-level flowchart illustrating various techniques for a storage client implementing dynamically optimized bandwidth for a quorum-based, distributed storage system, according to some embodiments.

FIG. 10 is a high-level flowchart illustrating another set of various techniques for a database implementing dynamically optimized bandwidth for a quorum-based, distributed storage system, according to some embodiments. Similar to FIG. 9 above, an update at a storage client may be received as indicated at 1010. A write request indicating the update may be sent to different storage nodes of a protection group sufficient to satisfy a write quorum requirement for the write request, as indicated at 1020. In at least some embodiments, one or more remaining storage nodes in the protection group may not be sent the write request. In this way, less network bandwidth may be used to send the write request. Also, as described above with regard to element 920, determining which of the storage nodes to send the write request nodes may be done in different ways, weighing one or more multiple different factors. For example, various different analysis techniques of the health, cost or state of the protection group storage nodes either as a whole, or individually may be considered, as is discussed in above with regard to FIG. 4 and below with regard to FIG. 12. The load balance of traffic among storage nodes may be weighed against the individual reliability of storage nodes. The architecture or physical schema of the distributed storage system may also be considered when identifying storage nodes to send the write request to. For example, communication channels (e.g., external network connections) between one availability zone and another (which may be in a different physical location) may be of limited bandwidth or capacity. The network bandwidth utilization or capabilities of the storage client may also be considered. For example, the storage client may be limited to a certain number of data packets per second that may be sent and/or received.

As indicated at 1030, it may be determined that acknowledgments received from the various storage nodes may not satisfy the write quorum requirement, in various embodiments. Again, as above, this determination may be made in various ways. For example, an error message may be received from one of the storage nodes previously sent the write request which indicates that incorrect access information (e.g., a token, epoch number, etc.) may need to be updated and resent in order to complete write requests. A latency threshold may also be exceed (as discussed above), by a current write pending time.

In response to determining that the acknowledgments do not satisfy the write quorum requirements, the write request may be sent to at least one of the remaining storage nodes in the protection group that was not previously sent the write request, as indicated at 1040. For example, if storage nodes A and B in availability zone 1 are sent the write request and D and E in availability zone 2 are sent the write request, then storage node C in availability zone 1 and storage node F in availability zone 2 may be sent the write request. Similar to identifying the first storage nodes to send the write request, selecting from among the remaining storage nodes may also be performed in various ways. Dynamically evaluating the health or cost of the distributed storage system to determine one or more changes in the storage system, for example, may be used to select which is the next most healthy storage node to send the write request to, or the least costly to perform the write request. The various other evaluation techniques discussed above with regard to FIG. 9 and below with regard to FIG. 12 may be implemented as well, and thus the previous example was not intended to be limiting.

Based, at least in part, on acknowledgments received from the storage nodes from either the first storage nodes sent the write request and/or the additional storage nodes, it may be determined that the write quorum requirement for the write request is satisfied, as indicated at 1050. The write request may then be acknowledged as durable, as indicated at 1060.

Figure 11:
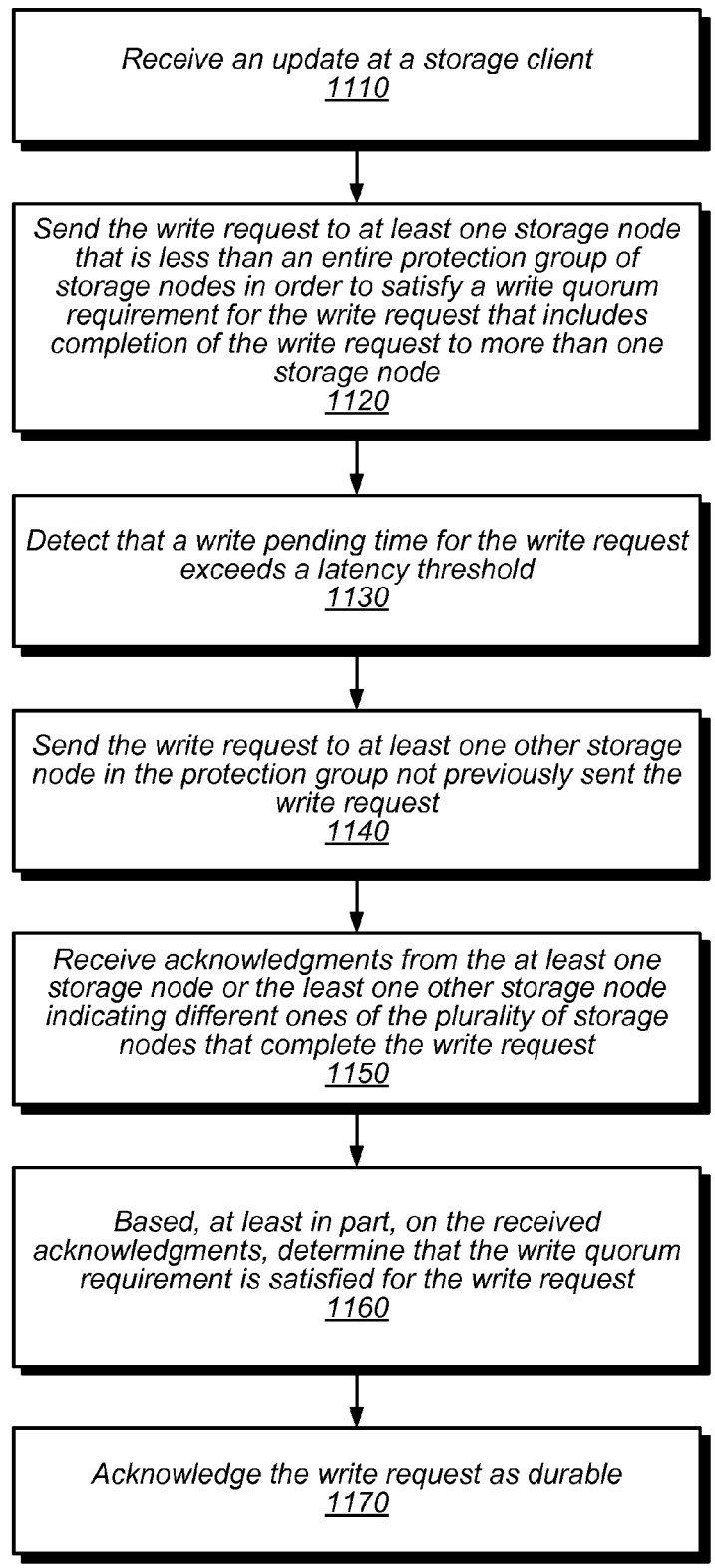
FIG. 11 is a high-level flowchart illustrating various techniques for a storage client implementing dynamically optimized bandwidth including a latency threshold, according to some embodiments.

FIG. 11 is a high-level flowchart illustrating another set of various techniques for a database implementing dynamically optimized bandwidth for a quorum-based, distributed storage system, according to some embodiments. Similar to FIGS. 9 and 10 above, an update at a storage client may be received, as indicated at 1110. In various embodiments, a write request indicating the update may be sent to at least one storage node that is less than the entire protection group of storage nodes in order to satisfy a write quorum requirement that includes completion of the write request to more than one storage node, as indicated at 1120. Similar to FIG. 9 above, the at least one storage node sent the write request may then perform various forwarding and/or replication techniques, such as those discussed above with regard to FIG. 6, and below with regard to FIG. 12. For example, storage nodes of a protection group may broadcast log records received and persisted at the particular storage node to other storage nodes in the protection group. Based, on these broadcasts, a storage node may be able to determine whether to forward received write requests to other storage nodes. Storage nodes may also, in some embodiments, forward write requests to those storage nodes who do not broadcast or advertise maintaining a write request within a latency threshold for the write request.

As indicated at 1130, it may be detected that a write pending time for the write request exceeds a latency threshold. Thus, for example, if a write is pending (i.e., not acknowledged/identified as durable) at a storage client, the storage client, or client-side storage driver may register a timestamp at which the write requests are sent. Based on a current time and the respective timestamp, the storage client may determine that the elapsed time exceeds the amount indicated by the latency threshold. In response to detecting that the latency threshold is exceeded, the write request may be sent to another storage in the protection group not previously sent the write request, as indicated at 1140.

Similar to FIGS. 9 and 10 above, acknowledgments may then be received from the at least one storage node and/or the other storage node indicating different storage nodes that have completed (or maintained or persisted) the write request, as indicated at 1150. In various embodiments, based, at least in part, on these acknowledgments received from the storage nodes, it may be determined that the write quorum requirement for the write request is satisfied, as indicated at 1160. The write request may then be acknowledged as durable, as indicated at 1170.

Figure 12:
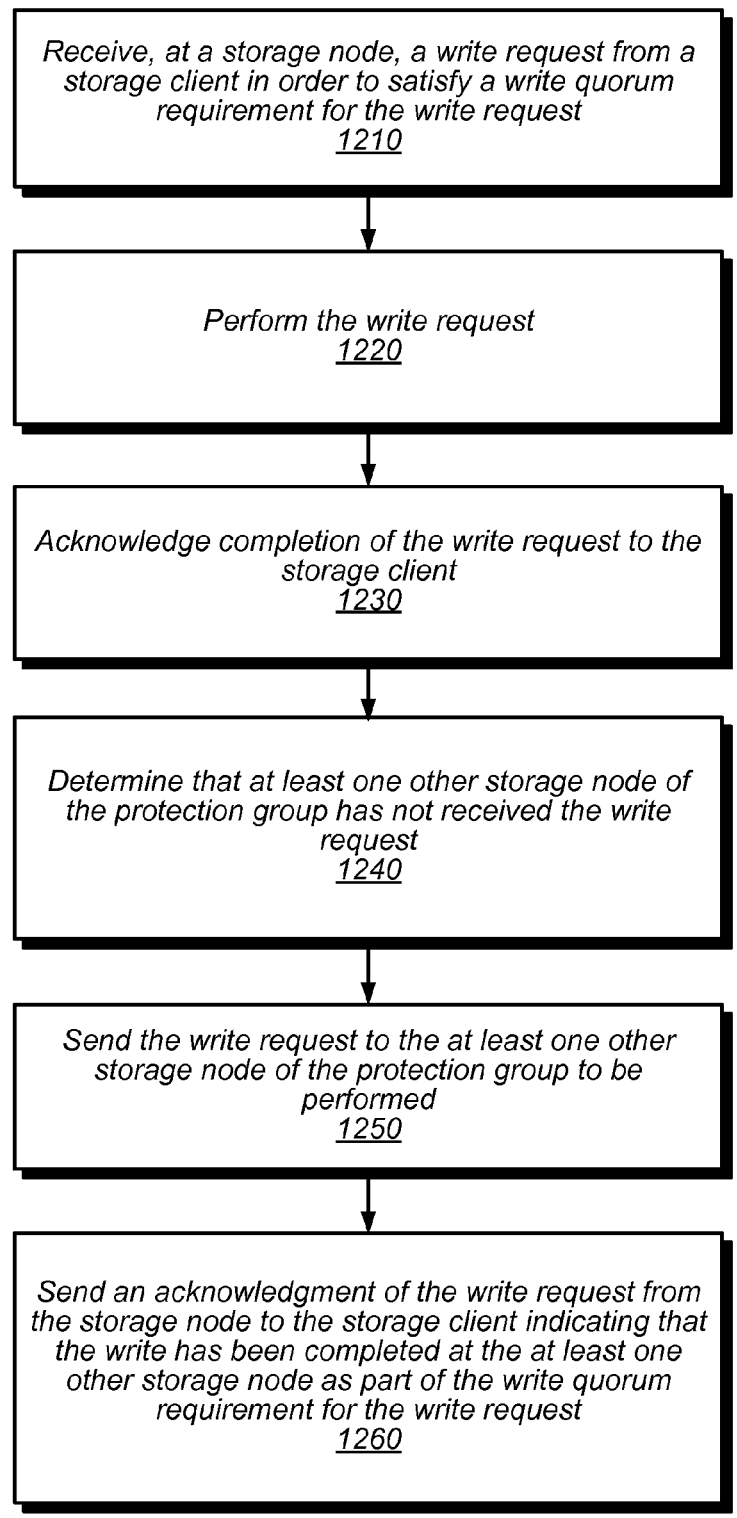
FIG. 12 is a high-level flowchart illustrating various techniques for implementing dynamic bandwidth utilization at a quorum-based distributed storage system, according to some embodiments.

FIG. 12 is a high-level flowchart illustrating various techniques for implementing dynamic bandwidth utilization at a quorum-based distributed storage system, according to some embodiments. In various embodiments, a write request may be received, at storage node of a protection group, from a storage client in order to satisfy a write quorum for the write request, as indicated at 1210. A storage node, such as storage system server node 430 described above with regard to FIG. 4, may be configured to receive write requests, or various other changes, modifications, or transformations of data stored for a storage client. In at least some embodiments, a storage node may implement a log-structured data store and receive log records as the write request. As indicated at 1220, the write request may be performed. For example, if the write request is a log record, then the log record may be appending to a log portion of the storage node (such as illustrated above with regard to FIG. 7). Other ways to complete performance of the write may depend on the client and/or storage system. The completion of the write request may then be acknowledged to the storage client, in some embodiments, as indicated at 1230. In some embodiments, acknowledgment of the completion of the write request may occur at another time, such as when acknowledging on behalf of other storage nodes, as indicated at 1260.

As indicated at 1240, it may be determined that another storage node in the protection group has not received the write request, in some embodiments. Such a determination may be made in numerous ways. For example, storage nodes in a protection group may implement a peer-to-peer protocol with other storage nodes in the protection group. The protocol may allow storage nodes to communicate some indication of their contents, such as the highest sequence number for a log record stored, or highest version number for a data object stored, to other storage nodes in the protection group. A storage node may use information obtained via the peer-to-peer protocol to determine whether a particular storage node has received and completed/persisted the write request (e.g., if the highest sequence number or version is lower than that associated with the completed write request). A storage node may also query storage nodes, or monitor incoming or outgoing traffic from other storage nodes to determine if a communication that might include the write request is made to the storage node.

In some embodiments, similar to FIGS. 9-11 above, part of the determination of whether a storage node has completed a write request may be performed in response to detecting that a current write pending time exceeds a latency threshold. For example, a storage node may receive a write request, and wait until the current write pending time has passed the threshold, prior to determining whether another storage node did not receive the write request. In this way, in some embodiments, less network traffic may be generated if some storage nodes receive write requests faster than others, but still within the latency threshold.

As indicated at 1250, in response to determining that a storage node did not receive the write request, the write request may be sent to the determined storage node to be performed, in various embodiments. This request may be formatted similar to a write request received from a storage client, or, in some embodiments, may be sent via a replication protocol (e.g., using the peer-to-peer protocol discussed above). An acknowledgment may be received from the storage nodes that are sent the write request, or the completed write request may be included in information broadcast, such as the peer-to-peer protocol mentioned above, to some or all of the storage nodes in the protection group.

In various embodiments, an acknowledgment may be sent to the storage client indicating that the at least one storage client that was sent the write request, has completed the write request as part of the write quorum requirement for the write request, as indicated at 1260. In at least some embodiments, it may be determined that the write quorum requirement is satisfied at the storage node, and indication of satisfying the write quorum requirement may be sent to the storage client.

Figure 13:
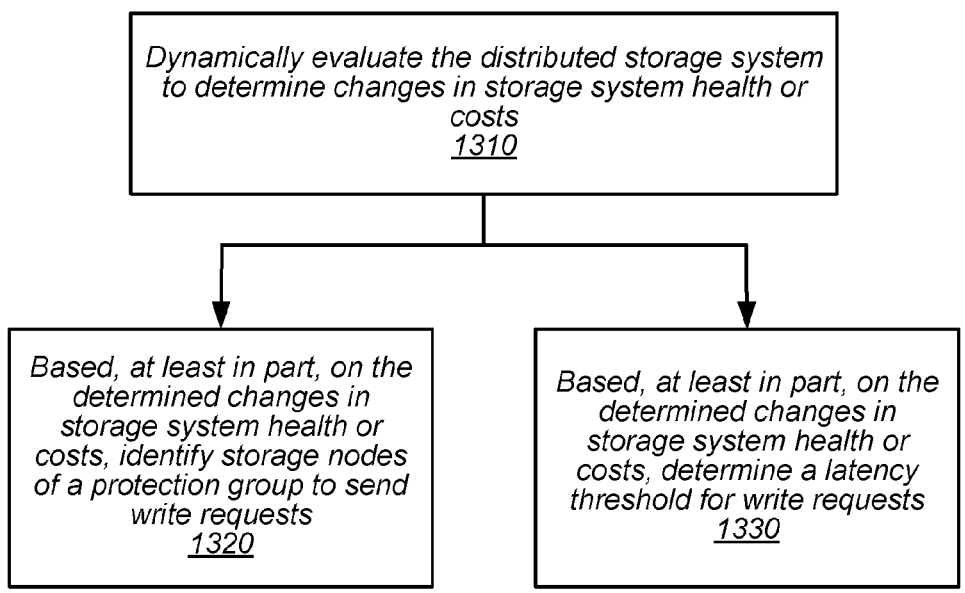
FIG. 13 is a high-level flowchart illustrating a method to dynamically evaluate a distributed storage system for bandwidth utilization, according to some embodiments.

Various different actions in the techniques described above may be tuned or adjusted to further dynamically utilize bandwidth in a quorum-based distributed storage system. FIG. 13 is a high-level flowchart illustrating a method to dynamically evaluate a distributed storage system for bandwidth utilization, according to some embodiments. The distributed storage system may be dynamically evaluated to determine changes in the health or cost of the distributed storage system, as indicated at 1310. For example, current performance characteristics of one or more nodes in a protection group may be determined (such as by examining their lag behind other storage nodes processing the same write requests), or the amount of network traffic directed toward one or more protection group members may also be evaluated. The cost to perform a particular operation, such as a write request, may be measured generally, or at a specific time and/or location in the distributed storage system (or from the storage client). In some embodiments, the distributed storage system may be a multi-tenant, so a storage node may be also storing for data for another more active storage client than other members in the protection group. As these various factors may change, real-time monitoring and/or various other data collection and evaluation techniques may be implemented to dynamically determine changes in the health or cost of the distributed storage system. For instance, the storage nodes of a protection group may report various performance information to a centralized analysis system, such as distributed storage bandwidth analysis module 464 described above with regard to FIG. 4. In some embodiments, the collected data may for one or more storage nodes exceed an obsolescence threshold (e.g. if not updated for a period of time). Meta-analysis may be performed in order to better understand the distributed storage system as a whole. For example various machine learning techniques may be used to identify similarities between current conditions and historical data, and determine one or more adjustments or tuning actions to take for the distributed storage system.

As indicated at 1320, one such tuning action may be identifying of storage nodes in a protection group to send write requests based, at least in part, on one or more changes in the health or cost of the distributed storage system, in various embodiments. For example, a particular storage node in a protection group may be overloaded (whether based on workload for this protection group or another protection group, service, or function that it provides). Sending write requests to this protection group may be avoided, or lowered in a priority ranking or scheme of storage nodes in a protection group that is used for the purpose of selecting storage nodes to write to. Similarly, different load balancing schemes may be implemented as part of the dynamic identification of storage nodes to send write requests to. In some embodiments, a change in health or cost may represent a change to an unknown health, cost or other status of a storage node. For example, if one storage node's health has not been recently determined, at least one other storage node may be sent a write request when sending a write to the storage node with unknown characteristics in case the storage node is not available or performing poorly. Various other performance characteristics of storage nodes may be used as part of identifying storage nodes to send write requests to.

As indicated at 1330, another tuning action may be determining a latency threshold for write requests based, at least in part, on changes in the storage system health or cost, in various embodiments. For example, if a network utilization among the storage nodes is dynamically determined to change from high to low utilization, then the latency threshold may be decreased, as additional bandwidth may be available to send write requests. Contra wise, an uptick in network utilization may lead to an increase in the latency threshold. Past latency determinations, such as collected in the monitoring distributed storage system activity and/or storage client activity, or prior writes, may also be used to determine the latency threshold, in some embodiments.

Although not illustrated, determined changes in the health or cost of distributed storage may be used to determine which ones of the various techniques discussed above to implement. For example, if processing capacity is low among storage nodes in a protection group, replication or forwarding techniques, such as those described above with regard to FIG. 12 may be suspended, and more client-based dynamic utilization strategies, such as the techniques discussed above with regard to FIG. 10, may be instructed to be performed.

The methods described herein may in various embodiments be implemented by any combination of hardware and software. For example, in one embodiment, the methods may be implemented by a computer system (e.g., a computer system as in FIG. 14) that includes one or more processors executing program instructions stored on a computer-readable storage medium coupled to the processors. The program instructions may be configured to implement the functionality described herein (e.g., the functionality of various servers and other components that implement the database services/systems and/or storage services/systems described herein).

Figure 14:
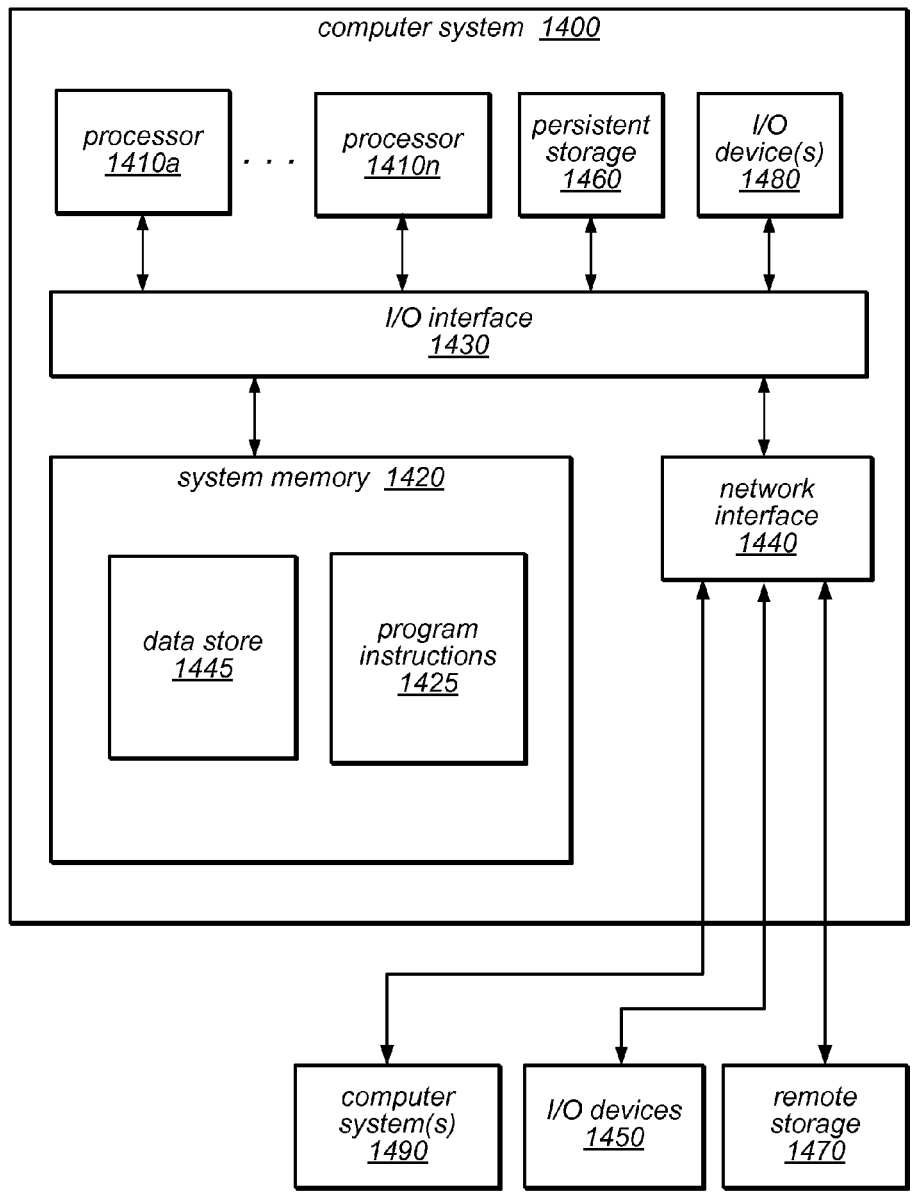
FIG. 14 is an example computer system, according to various embodiments.

FIG. 14 is a block diagram illustrating a computer system configured to implement at least a portion of the database systems described herein, according to various embodiments. For example, computer system 1400 may be configured to implement a database engine head node of a database tier, or one of a plurality of storage nodes of a separate distributed storage system that stores databases and associated metadata on behalf of clients of the database tier, in different embodiments. Computer system 1400 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1400 includes one or more processors 1410 (any of which may include multiple cores, which may be single or multi-threaded) coupled to a system memory 1420 via an input/output (I/O) interface 1430. Computer system 1400 further includes a network interface 1440 coupled to I/O interface 1430. In various embodiments, computer system 1400 may be a uniprocessor system including one processor 1410, or a multiprocessor system including several processors 1410 (e.g., two, four, eight, or another suitable number). Processors 1410 may be any suitable processors capable of executing instructions. For example, in various embodiments, processors 1410 may be general-purpose or embedded processors implementing any of a variety of instruction set architectures (ISAs), such as the x86, PowerPC, SPARC, or MIPS ISAs, or any other suitable ISA. In multiprocessor systems, each of processors 1410 may commonly, but not necessarily, implement the same ISA. The computer system 1400 also includes one or more network communication devices (e.g., network interface 1440) for communicating with other systems and/or components over a communications network (e.g. Internet, LAN, etc.). For example, a client application executing on system 1400 may use network interface 1440 to communicate with a server application executing on a single server or on a cluster of servers that implement one or more of the components of the database systems described herein. In another example, an instance of a server application executing on computer system 1400 may use network interface 1440 to communicate with other instances of the server application (or another server application) that may be implemented on other computer systems (e.g., computer systems 1490).

In the illustrated embodiment, computer system 1400 also includes one or more persistent storage devices 1460 and/or one or more I/O devices 1480. In various embodiments, persistent storage devices 1460 may correspond to disk drives, tape drives, solid state memory, other mass storage devices, or any other persistent storage device. Computer system 1400 (or a distributed application or operating system operating thereon) may store instructions and/or data in persistent storage devices 1460, as desired, and may retrieve the stored instruction and/or data as needed. For example, in some embodiments, computer system 1400 may host a storage system server node, and persistent storage 1460 may include the SSDs attached to that server node.

Computer system 1400 includes one or more system memories 1420 that are configured to store instructions and data accessible by processor(s) 1410. In various embodiments, system memories 1420 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1420 may contain program instructions 1425 that are executable by processor(s) 1410 to implement the methods and techniques described herein. In various embodiments, program instructions 1425 may be encoded in platform native binary, any interpreted language such as Java™ byte-code, or in any other language such as C/C++, Java™, etc., or in any combination thereof. For example, in the illustrated embodiment, program instructions 1425 include program instructions executable to implement the functionality of a database engine head node of a database tier, or one of a plurality of storage nodes of a separate distributed storage system that stores databases and associated metadata on behalf of clients of the database tier, in different embodiments. In some embodiments, program instructions 1425 may implement multiple separate clients, server nodes, and/or other components.

In some embodiments, program instructions 1425 may include instructions executable to implement an operating system (not shown), which may be any of various operating systems, such as UNIX, LINUX, Solaris™, MacOS™, Windows™, etc. Any or all of program instructions 1425 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1400 via I/O interface 1430. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1400 as system memory 1420 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1440.

In some embodiments, system memory 1420 may include data store 1445, which may be configured as described herein. For example, the information described herein as being stored by the database tier (e.g., on a database engine head node), such as a transaction log, an undo log, cached page data, or other information used in performing the functions of the database tiers described herein may be stored in data store 1445 or in another portion of system memory 1420 on one or more nodes, in persistent storage 1460, and/or on one or more remote storage devices 1470, at different times and in various embodiments. Similarly, the information described herein as being stored by the storage tier (e.g., redo log records, coalesced data pages, and/or other information used in performing the functions of the distributed storage systems described herein) may be stored in data store 1445 or in another portion of system memory 1420 on one or more nodes, in persistent storage 1460, and/or on one or more remote storage devices 1470, at different times and in various embodiments. In general, system memory 1420 (e.g., data store 1445 within system memory 1420), persistent storage 1460, and/or remote storage 1470 may store data blocks, replicas of data blocks, metadata associated with data blocks and/or their state, database configuration information, and/or any other information usable in implementing the methods and techniques described herein.

In one embodiment, I/O interface 1430 may be configured to coordinate I/O traffic between processor 1410, system memory 1420 and any peripheral devices in the system, including through network interface 1440 or other peripheral interfaces. In some embodiments, I/O interface 1430 may perform any necessary protocol, timing or other data transformations to convert data signals from one component (e.g., system memory 1420) into a format suitable for use by another component (e.g., processor 1410). In some embodiments, I/O interface 1430 may include support for devices attached through various types of peripheral buses, such as a variant of the Peripheral Component Interconnect (PCI) bus standard or the Universal Serial Bus (USB) standard, for example. In some embodiments, the function of I/O interface 1430 may be split into two or more separate components, such as a north bridge and a south bridge, for example. Also, in some embodiments, some or all of the functionality of I/O interface 1430, such as an interface to system memory 1420, may be incorporated directly into processor 1410.

Network interface 1440 may be configured to allow data to be exchanged between computer system 1400 and other devices attached to a network, such as other computer systems 1490 (which may implement one or more storage system server nodes, database engine head nodes, and/or clients of the database systems described herein), for example. In addition, network interface 1440 may be configured to allow communication between computer system 1400 and various I/O devices 1450 and/or remote storage 1470. Input/output devices 1450 may, in some embodiments, include one or more display terminals, keyboards, keypads, touchpads, scanning devices, voice or optical recognition devices, or any other devices suitable for entering or retrieving data by one or more computer systems 1400. Multiple input/output devices 1450 may be present in computer system 1400 or may be distributed on various nodes of a distributed system that includes computer system 1400. In some embodiments, similar input/output devices may be separate from computer system 1400 and may interact with one or more nodes of a distributed system that includes computer system 1400 through a wired or wireless connection, such as over network interface 1440. Network interface 1440 may commonly support one or more wireless networking protocols (e.g., Wi-Fi/IEEE 802.11, or another wireless networking standard). However, in various embodiments, network interface 1440 may support communication via any suitable wired or wireless general data networks, such as other types of Ethernet networks, for example. Additionally, network interface 1440 may support communication via telecommunications/telephony networks such as analog voice networks or digital fiber communications networks, via storage area networks such as Fibre Channel SANs, or via any other suitable type of network and/or protocol. In various embodiments, computer system 1400 may include more, fewer, or different components than those illustrated in FIG. 14 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a database engine head node within the database tier of a database system may present database services and/or other types of data storage services that employ the distributed storage systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

The various methods as illustrated in the figures and described herein represent example embodiments of methods. The methods may be implemented manually, in software, in hardware, or in a combination thereof. The order of any method may be changed, and various elements may be added, reordered, combined, omitted, modified, etc.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
a plurality of storage nodes of a distributed storage system implementing a protection group storing data for a storage client, wherein each storage node includes a corresponding processor; and
the storage client implementing a client-side storage driver module via a storage client processor, wherein the client-side storage driver module is configured to:
in response to receiving an update to the data:
send a write request indicating the update to different ones of the plurality of storage nodes sufficient to satisfy a write quorum requirement for the write request, wherein one or more remaining storage nodes of the protection group are not sent the write request;
determine that one or more acknowledgements received from the different ones of the plurality of storage nodes do not satisfy the write quorum requirement;
in response to said determination, send the write request to at least one of the one or more remaining storage nodes of the protection group in order to satisfy the write quorum requirement; and
based, at least in part, on the one or more acknowledgements received from the different ones of the plurality of storage nodes and one or more acknowledgments received from the one or more remaining storage nodes, determine that the write quorum requirement for the write request is satisfied; and
in response to said determination that the write quorum requirement for the write request is satisfied, acknowledge the write request as durable.

2. The system of claim 1, wherein to determine that the one or more acknowledgements received from the different ones of the plurality of storage nodes do not satisfy the write quorum requirement, the client-side storage driver module is further configured to detect that a write pending time for the write request exceeds a latency threshold.

3. The system of claim 1, wherein the client-side storage driver module is further configured to, based at least in part on one or more storage system health or cost indicators, identify the different ones of the plurality of storage nodes implementing the protection group to send the write request.

4. The system of claim 3,
wherein system further comprises a storage bandwidth analysis module implemented as part of the distributed storage system that monitors the storage nodes implementing the distributed storage system including the plurality of storage nodes of the protection group and the storage client, and is configured to detect at least one change in the distributed storage system, wherein the at least one change is:
a change in network utilization among one or more of the plurality of storage nodes;
a change in network utilization at the storage;
a change in write performance of one or more of the plurality of storage nodes; or
collected health or cost data of one or more of the plurality of storage nodes exceeding an obsolescence threshold; and
in response to detecting the at least one change, send to the client-side storage driver module the one or more health or cost indicators that indicate the detected at least one change in order to identify storage nodes of the protection group for subsequent write requests.

5. The system of claim 1,
wherein the storage client is a database node implemented as part of a network-based distributed database service, wherein the data is stored for a database, wherein the distributed storage system is implemented as part of a multi-tenant, network-based, distributed storage service, wherein the write request is a log record;
wherein, to send the write request to the different ones of the plurality of storage nodes, the client-side storage driver module is configured to send the log record to the different ones of the plurality of storage nodes; and
wherein each of the plurality of storage nodes is further configured to persist received log records in a log-structured data store for the data stored for the database.

6. A method, comprising:
performing, by one or more computing devices:
in response to receiving an update to data at a storage client:
sending a write request indicating the update to at least two storage nodes of a plurality of storage nodes of a distributed storage system implementing a protection group storing the data for the storage client, wherein a write quorum requirement for the write request includes completion of the write request to more than two storage nodes, wherein the at least two storage nodes sent the write request comprise less than the entire plurality of storage nodes implementing the protection group;
receiving one or more acknowledgments from one or more of the at least two storage nodes indicating at least one other storage node that completes the write request, wherein the at least one other storage node is one of the plurality of storage nodes that did not receive the write request from the storage client;
based, at least in part, on the acknowledgments, determining that the write quorum requirement is satisfied for the write request; and
identifying the write request as durable.

7. The method of claim 6, further comprising:
detecting that a write pending time for the write request exceeds a latency threshold; and
in response to said detecting, sending the write request to the at least one other storage node in the protection group not previously sent the write request;
wherein said determining that the write request satisfies the write quorum requirement for the write request is further based on one or more acknowledgements received from the at least one other storage node.

8. The method of claim 7, further comprising dynamically determining the latency threshold based, at least in part, on one or more of:
network utilization among the plurality of storage nodes implementing the protection group;
network utilization at the storage client; or
past latency determinations for prior write requests.

9. The method of claim 6, further comprising based, at least in part, on a change in storage system health or costs for the plurality of storage nodes or the storage client, identify the at least two storage nodes to send the write request.

10. The method of claim 6, wherein one of the at least two storage nodes is implemented in a different availability zone than the other one of the at least two storage nodes.

11. The method of claim 6, further comprising performing said sending, said receiving, said determining, and said identifying in response to receiving another update, wherein one of the at least two nodes of the protection group sent write request for the other update is different from the at least two nodes of the protection group sent the write request for the update.

12. The method of claim 6, wherein the database is implemented as part of a network-based storage service, and wherein the distributed storage system is a multi-tenant, network-based storage service.

13. A non-transitory, computer-readable storage medium, storing program instructions that when performed by one or more computing devices cause the one or more computing devices to implement:
in response to receiving an update at a storage client:
sending a write request indicating the update to at least one storage node of a plurality of storage nodes of a distributed storage system implementing a protection group storing data for the storage client, wherein a write quorum requirement for the write request includes completion of the write request to more than one storage node, wherein the at least one storage node sent the write request comprises less than the entire plurality of storage nodes implementing the protection group;
detecting that a write pending time for the write request exceeds a latency threshold;
in response to said detecting, sending the write request to at least one other storage node in the protection group not previously sent the write request;
receiving acknowledgments from the at least one storage node or the least one other storage node indicating different ones of the plurality of storage nodes that complete the write request;
based, at least in part, on the acknowledgments, determining that the write quorum requirement is satisfied for the write request; and
identifying the write request as committed.

14. The non-transitory, computer-readable storage medium of claim 13, wherein the program instructions cause the one or more computing devices to further implement:
dynamically evaluating the distributed storage system to determine one or more changes in storage system health or cost; and
based, at least in part, on the one or more changes in storage system, identifying the at least one storage node to send the write request.

15. The non-transitory, computer-readable storage medium of claim 13, wherein the program instructions cause the one or more computing devices to further implement:
dynamically evaluating the distributed storage system to determine one or more changes in storage system health or cost; and
based, at least in part, on the one or more changes in storage system, determining the latency threshold.

16. The non-transitory, computer-readable storage medium of claim 13, wherein each storage node of the protection group implements log-structured data storage, and wherein the write request is a log record indicating the update to the database.

17. The non-transitory, computer-readable storage medium of claim 13, wherein the storage client is a database node implemented as part of a network-based storage service, and wherein the distributed storage system is a multi-tenant, network-based storage service.

18. A distributed storage system, comprising:
a plurality of storage nodes implementing a protection group storing data for a storage client, wherein each storage node includes a corresponding processor, wherein each of the storage nodes is configured to:
receive a write request from a storage client in order to satisfy a write quorum requirement for the write request at the protection group;
perform the write request;
send an acknowledgment of completion of the write request to the storage client;
determine that at least one other storage node of the protection group has not received the write request;
in response to said determining:
send the write request from the storage node to be performed at the at least one other storage node of the protection group; and
send another acknowledgment of the write request to the storage client indicating that the write request has been completed at the at least one other storage node as part of the write quorum requirement for the write request.

19. The system of claim 18, wherein each of the plurality of storage nodes is further configured to:
detect that a write pending time for the write request exceeds a latency threshold; and
in response to said detecting, performing said determination that the at least one other storage node of the protection group has not received the write request.

20. The system of claim 19, wherein each of the plurality of storage nodes is further configured to dynamically determine the latency threshold based, at least in part, on one or more storage system health or cost indicators.

21. The system of claim 18, wherein to determine that the at least one other storage node of the protection group has not received the write request, each of the plurality of storage nodes is configured to identify the at least one other storage node from among other storage nodes of the protection group in a same availability zone as the storage node.

22. The system of claim 18, wherein each storage node of the protection group implements log-structured data storage, and wherein the write request is a log record indicating updates to the data for the storage client.

23. The system of claim 18, wherein the storage client is a network-based database service, and wherein the distributed storage system is a multi-tenant, network-based storage service.

* * * * *